(12) United States Patent
Berney et al.

(10) Patent No.: US 12,117,415 B2
(45) Date of Patent: Oct. 15, 2024

(54) INTEGRATED ION SENSING APPARATUS AND METHODS

(71) Applicant: ANALOG DEVICES INTERNATIONAL UNLIMITED COMPANY, Limerick (IE)

(72) Inventors: Helen Berney, Pennywell (IE); Alan O'Donnell, Castletroy (IE); Thomas O'Dwyer, Arlington, MA (US); Alfonso Berduque, Crusheen (IE)

(73) Assignee: Analog Devices International Unlimited Company, Limerick (IE)

( * ) Notice: Subject to any disclaimer, the term of this patent is extended or adjusted under 35 U.S.C. 154(b) by 0 days.

(21) Appl. No.: 16/613,584

(22) PCT Filed: May 15, 2018

(86) PCT No.: PCT/EP2018/062505
§ 371 (c)(1),
(2) Date: Nov. 14, 2019

(87) PCT Pub. No.: WO2018/210803
PCT Pub. Date: Nov. 22, 2018

(65) Prior Publication Data
US 2020/0072783 A1    Mar. 5, 2020

Related U.S. Application Data

(60) Provisional application No. 62/506,318, filed on May 15, 2017.

(51) Int. Cl.
*G01N 27/333* (2006.01)
*G01N 27/414* (2006.01)
*G01N 27/416* (2006.01)

(52) U.S. Cl.
CPC ......... *G01N 27/333* (2013.01); *G01N 27/414* (2013.01); *G01N 27/4163* (2013.01)

(58) Field of Classification Search
None
See application file for complete search history.

(56) References Cited

U.S. PATENT DOCUMENTS 4,135,999 A * 1/1979 Schindler ........... G01N 27/3335
                                                       204/418
4,377,446 A    3/1983 Albery
(Continued)

FOREIGN PATENT DOCUMENTS

CN    1728365 A    2/2006
CN    1877989 A    12/2006
(Continued)

OTHER PUBLICATIONS

International Search Report and Written Opinion, mailed Aug. 8, 2018, in International Application No. PCT/EP2018/062505, 12 pages.
(Continued)

*Primary Examiner* — J. Christopher Ball
(74) *Attorney, Agent, or Firm* — Knobbe, Martens, Olson & Bear, LLP

(57) ABSTRACT

An integrated ion-sensitive probe is provided. In an example, an ion-sensitive probe can include a semiconductor substrate and a first passive electrode attached to the semiconductor substrate. The first passive electrode can be configured to contact a solution and to provide a first electrical voltage as function of a concentration of an ion within the solution. In certain examples, a passive reference electrode can be co-located on the semiconductor substrate. In some examples, processing electronics can be integrated on the semiconductor substrate.

23 Claims, 27 Drawing Sheets

(56) References Cited

U.S. PATENT DOCUMENTS

| | | |
|---|---|---|
| 4,575,330 A | 3/1986 | Hull |
| 4,671,852 A | 6/1987 | Pyke |
| 4,752,352 A | 6/1988 | Feygin |
| 4,863,538 A | 9/1989 | Deckard |
| 5,173,166 A | 12/1992 | Tomantschger et al. |
| 5,183,550 A | 2/1993 | Mattiessen |
| 5,313,365 A | 5/1994 | Pennisi et al. |
| 5,348,693 A | 9/1994 | Taylor et al. |
| 5,547,554 A | 8/1996 | Kiesele |
| 5,624,546 A | 4/1997 | Milco |
| 5,666,127 A | 9/1997 | Kochiyama et al. |
| 5,870,482 A | 2/1999 | Loeppert et al. |
| 6,075,239 A | 6/2000 | Aksyuk et al. |
| 6,765,287 B1 | 7/2004 | Lin |
| 6,781,231 B2 | 8/2004 | Minervini |
| 6,800,930 B2 | 10/2004 | Jackson et al. |
| 6,803,559 B2 | 10/2004 | Hsu et al. |
| 6,879,429 B2 | 4/2005 | Wong et al. |
| 6,894,502 B2 | 5/2005 | Feng et al. |
| 6,997,698 B2 | 2/2006 | Silverbrook |
| 7,077,938 B1 | 7/2006 | Austen et al. |
| 7,130,177 B2 | 10/2006 | Aizawa et al. |
| 7,202,552 B2 | 4/2007 | Zhe et al. |
| 7,208,832 B2 | 4/2007 | Yamagata |
| 7,242,089 B2 | 7/2007 | Minervini |
| 7,255,551 B2 | 8/2007 | Taylor et al. |
| D575,056 S | 8/2008 | Tan |
| 7,550,834 B2 | 6/2009 | Yu et al. |
| 7,648,911 B2 | 1/2010 | Pagaila et al. |
| 7,691,747 B2 | 4/2010 | Lin et al. |
| 7,719,427 B2 | 5/2010 | Hsiung et al. |
| 7,723,831 B2 | 5/2010 | Kwang et al. |
| 7,855,429 B2 | 12/2010 | Ishida et al. |
| 7,875,942 B2 | 1/2011 | Cortese et al. |
| 7,898,043 B2 | 3/2011 | Ziglioli et al. |
| 8,101,898 B2 | 1/2012 | Koste et al. |
| 8,115,283 B1 | 2/2012 | Bolognia et al. |
| 8,155,355 B2 | 4/2012 | Ogura et al. |
| 8,199,939 B2 | 6/2012 | Suvanto et al. |
| 8,274,147 B2 | 9/2012 | Rofougaran et al. |
| 8,280,207 B2 | 10/2012 | Pinguet et al. |
| 8,300,870 B2 | 10/2012 | Lee et al. |
| 8,339,798 B2 | 12/2012 | Minoo et al. |
| 8,350,382 B2 | 1/2013 | Furgut et al. |
| 8,362,589 B2 | 1/2013 | Quinn |
| 8,368,654 B2 | 2/2013 | Rosenblatt et al. |
| 8,390,083 B2 | 3/2013 | O'Donnell et al. |
| 8,395,252 B1 | 3/2013 | Yang |
| 8,402,666 B1 | 3/2013 | Hsu et al. |
| 8,436,690 B2 | 5/2013 | McCraith et al. |
| 8,436,698 B2 | 5/2013 | Rogers |
| 8,502,329 B2 | 8/2013 | Hsieh et al. |
| 8,569,861 B2 | 10/2013 | O'Donnell et al. |
| 8,574,413 B2 | 11/2013 | Mosley et al. |
| 8,577,063 B2 | 11/2013 | Yang |
| 8,625,832 B2 | 1/2014 | Lillelund |
| 8,637,943 B1 | 1/2014 | Yang |
| 8,754,643 B2 | 6/2014 | Gugel et al. |
| 8,779,532 B2 | 7/2014 | O'Donnell et al. |
| 8,847,340 B2 | 9/2014 | Baldo et al. |
| 8,852,513 B1 | 10/2014 | Speer et al. |
| 8,853,799 B2 | 10/2014 | O'Donnell et al. |
| 8,890,285 B2 | 11/2014 | O'Donnell et al. |
| 8,890,286 B2 | 11/2014 | O'Donnell et al. |
| 8,957,497 B2 | 2/2015 | O'Donnell et al. |
| 9,041,150 B2 | 5/2015 | O'Donnell et al. |
| 9,063,084 B1 | 6/2015 | Lin et al. |
| 9,156,680 B2 | 10/2015 | Kierse et al. |
| 9,267,915 B2 | 2/2016 | O'Donnell et al. |
| 9,269,831 B2 | 2/2016 | Ehrenpfordt et al. |
| 9,545,669 B2 | 1/2017 | Åklint et al. |
| 9,618,490 B2 | 4/2017 | Paik et al. |
| 9,661,408 B2 | 5/2017 | Kierse et al. |
| 9,818,665 B2 | 11/2017 | Elian et al. |
| 9,983,164 B1 | 5/2018 | Allen et al. |
| 9,993,982 B2 | 6/2018 | Sherrer et al. |
| 10,730,743 B2 | 8/2020 | Kierse et al. |
| 10,967,122 B2 | 4/2021 | Cima |
| 11,666,913 B2 | 6/2023 | Beaumont et al. |
| 2003/0000833 A1* | 1/2003 | Mansouri ............. G01N 33/492 204/402 |
| 2004/0000713 A1 | 1/2004 | Yamashita et al. |
| 2004/0190254 A1 | 9/2004 | Hu et al. |
| 2005/0156584 A1 | 7/2005 | Feng |
| 2005/0189622 A1 | 9/2005 | Humpston et al. |
| 2005/0253244 A1 | 11/2005 | Chang |
| 2006/0139883 A1 | 6/2006 | Hu et al. |
| 2006/0258053 A1 | 11/2006 | Lee et al. |
| 2006/0261460 A1 | 11/2006 | Sato et al. |
| 2006/0266098 A1 | 11/2006 | Eickhoff et al. |
| 2006/0283252 A1 | 12/2006 | Liu et al. |
| 2007/0053504 A1 | 3/2007 | Sato et al. |
| 2007/0071268 A1 | 3/2007 | Harney et al. |
| 2007/0082421 A1 | 4/2007 | Minerviani |
| 2007/0138027 A1 | 6/2007 | Dinsmoor et al. |
| 2007/0187826 A1 | 8/2007 | Shim et al. |
| 2007/0202627 A1 | 8/2007 | Minervini |
| 2007/0210423 A1 | 9/2007 | Hsu |
| 2007/0246806 A1 | 10/2007 | Ong et al. |
| 2007/0246813 A1 | 10/2007 | Ong et al. |
| 2007/0278601 A1 | 12/2007 | Goodelle et al. |
| 2007/0296065 A1 | 12/2007 | Yew et al. |
| 2008/0054431 A1 | 3/2008 | Wang et al. |
| 2008/0075309 A1 | 3/2008 | Chen et al. |
| 2008/0079142 A1 | 4/2008 | Carmona et al. |
| 2008/0151590 A1 | 6/2008 | Rogers et al. |
| 2008/0175425 A1 | 7/2008 | Roberts et al. |
| 2008/0217766 A1 | 9/2008 | Minervini |
| 2008/0234599 A1 | 9/2008 | Chiao et al. |
| 2008/0265421 A1 | 10/2008 | Brunnbauer et al. |
| 2008/0304681 A1 | 12/2008 | Langlois et al. |
| 2009/0008792 A1 | 1/2009 | Ko et al. |
| 2009/0029492 A1 | 1/2009 | Tu et al. |
| 2009/0039492 A1 | 2/2009 | Kang et al. |
| 2009/0072334 A1 | 3/2009 | Saitoh |
| 2009/0079065 A1 | 3/2009 | Furgut et al. |
| 2009/0170242 A1 | 7/2009 | Lin et al. |
| 2009/0194829 A1 | 8/2009 | Chung et al. |
| 2009/0200620 A1 | 8/2009 | Omura et al. |
| 2009/0202089 A1 | 8/2009 | Zhang et al. |
| 2009/0204250 A1 | 8/2009 | Potyrailo et al. |
| 2009/0261460 A1 | 10/2009 | Kuan et al. |
| 2009/0283871 A1 | 11/2009 | Chang et al. |
| 2009/0302437 A1 | 12/2009 | Kim et al. |
| 2009/0320698 A1 | 12/2009 | LaPerna Wong |
| 2009/0321930 A1 | 12/2009 | Marcoux |
| 2010/0009133 A1 | 1/2010 | Chait |
| 2010/0032748 A1 | 2/2010 | Edwards |
| 2010/0044704 A1 | 2/2010 | Male et al. |
| 2010/0052630 A1 | 3/2010 | Chen |
| 2010/0055895 A1 | 3/2010 | Zafiropoulo et al. |
| 2010/0086146 A1 | 4/2010 | Gong et al. |
| 2010/0090295 A1 | 4/2010 | Zhe et al. |
| 2010/0134139 A1 | 6/2010 | Chen et al. |
| 2010/0142744 A1 | 6/2010 | Rombach et al. |
| 2010/0155863 A1 | 6/2010 | Weekamp |
| 2010/0171203 A1 | 7/2010 | Chen et al. |
| 2010/0181643 A1 | 7/2010 | Kothandaraman et al. |
| 2010/0193905 A1 | 8/2010 | Kim et al. |
| 2010/0284553 A1 | 11/2010 | Conti et al. |
| 2011/0013787 A1 | 1/2011 | Chang |
| 2011/0023929 A1 | 2/2011 | Edwards |
| 2011/0057273 A1 | 3/2011 | O'Donnell et al. |
| 2011/0101537 A1 | 5/2011 | Barth |
| 2011/0108933 A1 | 5/2011 | Nakatani |
| 2011/0140703 A1 | 6/2011 | Chiao et al. |
| 2011/0198714 A1 | 8/2011 | Yang |
| 2011/0199057 A1 | 8/2011 | Ivanov et al. |
| 2011/0293126 A1 | 12/2011 | Maekawa et al. |
| 2011/0317863 A1 | 12/2011 | Inoda et al. |
| 2012/0065617 A1 | 3/2012 | Matsiev et al. |
| 2012/0237073 A1 | 9/2012 | Goida et al. |
| 2012/0250925 A1 | 10/2012 | Lillelund |
| 2012/0321111 A1 | 12/2012 | Lillelund |

(56) References Cited

U.S. PATENT DOCUMENTS

| | | |
|---|---|---|
| 2013/0037909 A1 | 2/2013 | French |
| 2013/0105952 A1 | 5/2013 | Fontana et al. |
| 2013/0119509 A1 | 5/2013 | Farooq et al. |
| 2013/0250532 A1 | 9/2013 | Bryzek et al. |
| 2013/0273693 A1 | 10/2013 | Haba et al. |
| 2013/0299924 A1 | 11/2013 | Weber et al. |
| 2014/0014480 A1 | 1/2014 | Anderson et al. |
| 2014/0026649 A1 | 1/2014 | O'Donnell et al. |
| 2014/0034104 A1 | 2/2014 | O'Donnell et al. |
| 2014/0035630 A1 | 2/2014 | O'Donnell et al. |
| 2014/0044297 A1 | 2/2014 | Loeppert et al. |
| 2014/0103540 A1 | 4/2014 | Ching et al. |
| 2014/0162393 A1 | 6/2014 | Yang |
| 2014/0197042 A1 | 7/2014 | Zhang et al. |
| 2014/0233782 A1 | 8/2014 | Bolognia et al. |
| 2014/0250975 A1 | 9/2014 | Kane |
| 2014/0311905 A1 | 10/2014 | Stetter et al. |
| 2015/0010191 A1 | 1/2015 | Baumhauer, Jr. et al. |
| 2015/0075257 A1 | 3/2015 | Paik et al. |
| 2015/0075258 A1 | 3/2015 | Paik et al. |
| 2015/0090002 A1 | 4/2015 | Paik et al. |
| 2015/0131248 A1 | 5/2015 | Dakhiya et al. |
| 2015/0177171 A1 | 6/2015 | Kim et al. |
| 2015/0198551 A1 | 7/2015 | Jun et al. |
| 2015/0247818 A1 | 9/2015 | Silvester et al. |
| 2015/0346138 A1 | 12/2015 | Allen |
| 2015/0362451 A1 | 12/2015 | Hunziker et al. |
| 2016/0047774 A1 | 2/2016 | Teysseyre et al. |
| 2016/0105737 A1 | 4/2016 | Kierse et al. |
| 2017/0131230 A1 | 5/2017 | Papageorge et al. |
| 2017/0199148 A1* | 7/2017 | Berney ............... G01N 27/333 |
| 2017/0257687 A1 | 9/2017 | Kierse et al. |
| 2017/0336343 A1 | 11/2017 | Bhat et al. |
| 2018/0050486 A1 | 2/2018 | Talgorn et al. |
| 2018/0059044 A1 | 3/2018 | Berduque et al. |
| 2018/0372675 A1 | 12/2018 | Wade et al. |
| 2019/0135614 A1 | 5/2019 | Kierse et al. |
| 2019/0227024 A1 | 7/2019 | Bhat et al. |
| 2019/0227026 A1 | 7/2019 | Bhat et al. |
| 2020/0072783 A1 | 3/2020 | Berney et al. |
| 2020/0411398 A1 | 12/2020 | Bolognia et al. |

FOREIGN PATENT DOCUMENTS

| | | |
|---|---|---|
| CN | 101409279 A | 4/2009 |
| CN | 201490184 A | 5/2010 |
| CN | 106687804 A | 5/2017 |
| DE | 20 2014 102 842 U1 | 8/2014 |
| EP | 0015322 | 9/1980 |
| EP | 1732215 | 12/2006 |
| EP | 2086015 | 8/2009 |
| EP | 2765410 A1 | 8/2014 |
| EP | 2857349 A3 | 5/2015 |
| EP | 3480590 A1 | 5/2019 |
| JP | S60-012780 | 1/1985 |
| JP | 63-26569 | 2/1988 |
| JP | H04-152664 | 5/1992 |
| JP | H05-258925 | 10/1993 |
| JP | H10-051017 | 2/1998 |
| JP | 2002-111041 | 4/2002 |
| JP | 2002-246514 | 8/2002 |
| JP | 2004-207540 | 7/2004 |
| JP | 2004-349537 | 12/2004 |
| JP | 2005-283389 | 10/2005 |
| JP | 2005-353867 | 12/2005 |
| JP | 2006-245311 | 9/2006 |
| JP | 2006-344737 | 12/2006 |
| JP | 2006-352136 | 12/2006 |
| JP | 2007-103413 | 4/2007 |
| JP | 2007-234913 | 9/2007 |
| JP | 2008-017421 | 1/2008 |
| JP | 2008-173462 | 7/2008 |
| JP | 2009-081100 | 4/2009 |
| JP | 2009-081160 | 4/2009 |
| JP | 2009-200189 | 9/2009 |
| JP | 2010-087021 | 4/2010 |
| JP | 2010-251662 | 11/2010 |
| KR | 10-0537093 | 12/2005 |
| KR | 2006-0045375 | 5/2006 |
| KR | 2009-0117004 | 11/2009 |
| KR | 10-2010-0112699 | 10/2010 |
| WO | WO 96/02438 A1 | 2/1996 |
| WO | WO 97/44707 | 11/1997 |
| WO | WO 00/19190 A1 | 4/2000 |
| WO | WO 2005/101476 | 10/2005 |
| WO | WO 2007/129787 A1 | 11/2007 |
| WO | WO 2010/053997 | 5/2010 |
| WO | WO 2010/100929 | 9/2010 |
| WO | WO 2010/117874 | 10/2010 |
| WO | WO 2010/136919 | 12/2010 |
| WO | WO 2011/103720 | 9/2011 |
| WO | WO 2016/015028 A1 | 1/2016 |
| WO | WO 2016/163630 A1 | 10/2016 |
| WO | WO 2017/099963 A1 | 6/2017 |

OTHER PUBLICATIONS

Nie, Chuan et al., "An integrated flex-microfluidic-Si chip device towards sweat sensing applications," Sensors and Actuators B, May 2, 2016, vol. 227, pp. 427-437.

Zevenbergen, Marcel A.G. et al., "Electrochemical sensing of ethylene employing a thin ionic-liquid layer," Analytical Chemistry, Aug. 15, 2011, vol. 83, No. 16, pp. 6300-6307.

Zevenbergen, Marcel A.G. et al., "Solid state pH and chloride sensor with microfluidic reference electrode," 2016 IEEE International Electron Devices Meeting (IEDM), Dec. 2, 2016, pp. 26.1.1-26.1.4.

Berger, M., "Polymer Carpets—A New Class of Nanomaterials for NEMS and MEMS", Nanowerk, Sep. 2, 2010. (retrieved from http://www.nanowerk.com/spotlight/spotid=17875.php).

Chait et al. "Custom Designed Microstructures Using Metamaterials," Antenna Systems & Technology Magazine and Conference, World Wide Web Address: antennasonline.com/eprints/EoPlex_Sept10.html; accessed Aug. 24, 2012.

Chait, "High-Volume Print Forming, HVPFTM A New Method for Manufacturing Large Volumes of Complex Metal-Ceramic and Hybrid Components," World Wide Web Address: eoplex.com/images/eoplex_whitepaper_hvpf.pdf, accessed Aug. 24, 2012.

Chait, "Solving 'The Last Milli-Mile' Problem in Vehicle Safety; The EoPlex Approach to Powering Wireless Tire Pressure Sensors," World Wide Web Address: eoplex.com/images/eoplex_whitepaper_tire.pdf, accessed Aug. 24, 2012.

Chou, J., Chapter 2: Electrochemical Sensors, Hazardous Gas Monitors, 1000 McGraw-Hill, pp. 27-35.

Duplessis, M. et al., "Physical Implementation of 3D Integrated Solenoids within Silicon Substrate for Hybrid IC Applications", IEEE European Microwave Conference, Oct. 2009, pp. 1006-1009.

Extended European Search Report issued in application No. 20206101.6 on Apr. 30, 2021.

Fan, H.B. et al., "Prediction of Delamination in a Bi-material System based on Free-Edge Energy Evaluation", Proceedings of the 53rd IEEE Electronic Components and Technology Conference, May 2003, pp. 1160-1164.

Hagleitner et al., "Smart single-chip gas sensor microsystem", Nature 414, Nov. 15, 2001, 3 pages.

Hosiden, "Guide for Electret Condenser Microphones," World Wide Web Address: es.co.th/schemetic/pdf/KUC.pdf, accessed Aug. 24, 2012.

Japanese Office Action of Feb. 10, 2016 for Japanese Patent Application No. 2015-079984, filed Apr. 9, 2015, 4 pages and 4 page translation.

Kanellos, "How Do You Make a Fuel Cell? Print it," CNET News, World Wide Web Address: news.cnet.com/How-do-you-make-a-fuel-cell-Print-it/2100-1008_3-6078124.html?tag=sas.email; accessed Aug. 24, 2012.

Kim et al., "Hydrogel-Based Integrated Antenna-pH Sensor", IEEE Sensors Conference, 2007, pp. 695-698.

Luo, Y. et al., "An Improved Estimate for Thermal Stresses in Multi-Layer Assemblies", IEEE 11th Intersociety Conference on Thermal and Thermomechanical Phenomena in Electronic Systems, May 2008, pp. 842-852.

(56) References Cited

OTHER PUBLICATIONS

Maseeh et al., "A Novel Silicon Micro Amperometric Gas Sensor", IEEE 1991, pp. 359-362.
Massachusetts Institute of Technology, "Funneling Solar Energy: Antenna Made of Carbon Nanotubes Could Make Photovoltaic Cells More Efficient", ScienceDaily, Sep. 13, 2010. (retrieved from http://www.sciencedaily.com/releases/2010/09/100912151548.htm).
Meng, E. et al., "Polymer MEMS for Micro Fluid Delivery Systems", American Chemical Society (ACS) Polymer MEMS Symposia, New York, New York, USA, Sep. 2003. (two pages).
Moore, T.D., "Peeling Stress Analyzed for Resistance to Delamination—Application to Multiple Thin Films on a Thick Substrate", IEEE 9th Intersociety Conference on Thermomechanical Phenomena in Electronic Systems, Jun. 2004, vol. 2, pp. 330-335.
Open Music Labs, "Electret Microphones," World Wide Web Address: openmusiclabs.com/learning/sensors/electret-microphones/, accessed Aug. 24, 2012.
Rogren et al., "A High Performance and Cost Effective Molded Array Package Substrate," World Wide Web Address: eoplex.com/QFP_MR_White_Paper.pdf, accessed Aug. 24, 2012.
Roozeboom, F. et al., "System-in-Package Integration of Passives using 3D Through-Silicon Vias", Solid State Technology, May 2008, vol. 51, No. 5, pp. 38-47.
Taylor et al., "'Spatial Forming' A Three Dimensional Printing Process," World Wide Web Address: eoplex.com/images/eoplex_whitepaper_3dprinting.pdf, accessed Aug. 24, 2012.
University of Southern California, "Graphene Organic Photovoltaics: Flexible Material Only a Few Atoms Thick May Offer Cheap Solar Power", ScienceDaily, Jul. 24, 2010. (retrieved from http://www.sciencedaily.com/releases/2010/07/100723095430.htm).
Wang, K. et al., "Interfacial Shear Stress, Peeling Stress and Die Cracking Stress in Trilyaer Electronic Assemblies", IEEE 7th Intersociety Conference on Thermomechanical Phenomena in Electronic Systems, May 2000, vol. 2, pp. 56-64.
Website for Goldpoint pH Sensor orp202g-2 having 2014 copyright date, http://www.igpg.com.cn/Products/Online_pH_ORP_Sensor2/75.html (accessed Jun. 10, 2016).
Website related to Andose pH sensor Glass ORP/pH sensor, http://www.aliexpress.com/store/product/Glass-PH-sensor-PH-electrode-for-pipe-on-stallation-ph-G2008/1040787_32259217887.html (accessed Jun. 10, 2016).
Office Action received in European Application No. 18728051.6, dated Oct. 29, 2021 in 7 pages.
European Office Action of Nov. 9, 2023, for European Patent Application No. 18 728 051.6, 11 pages.
Wang, F. et al., "A Fully Integrated on-chip Electrochemical Microreactor for the Detection of Total Phosphorus in Freshwater", IEEE 18th International Conference on Solid-State Sensors, Actuators, and Microsystems, Jun. 21, 2015, pp. 1468-1471.

\* cited by examiner

700

701
CONTACTING A SENSING MATERIAL OF A FIRST PASSIVE ELECTRODE WITH THE SOLUTION, THE PASSIVE ELECTRODE INCLUDING A FIRST SILICON-BASED SUBSTRATE

703
AMPLIFYING AN INDICATION VOLTAGE BASED ON A FIRST VOLTAGE OF THE FIRST PASSIVE ELECTRODE TO PROVIDE AN INDICATION OF THE ION CONCENTRATION.

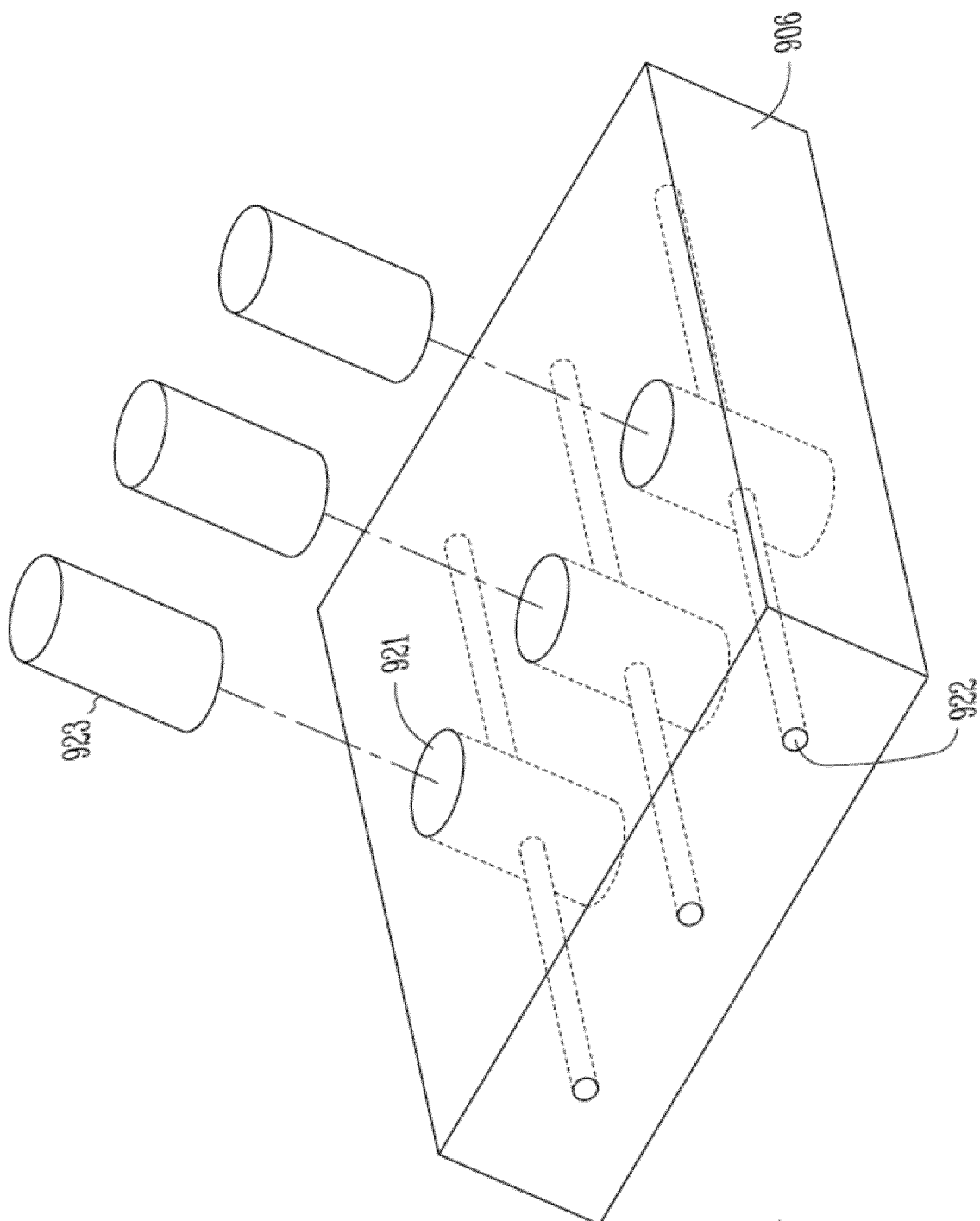

INTEGRATED ION SENSING APPARATUS AND METHODS

PRIORITY

This application claims the benefit of priority of O'Donnell, U.S. Provisional Patent Application No. 62/506,318, filed May 15, 2017, and titled, INTEGRATED ION SENSING APPARATUS AND METHODS.

BACKGROUND

A 'gold standard' for measuring ion concentration in an aqueous solution involves a glass electrode. A glass electrode system is a measurement device having a type of ion-selective, or ion-sensitive, electrode made of a doped glass membrane that is sensitive to a specific ion. A glass electrode system can include two electrodes, one for sensing the target ion, such as hydrogen ions ($H^+$), and one for providing a reference. Both electrodes provide a voltage at the interface to the liquid under test. The reference electrode provides a nearly constant voltage that can be independent of the target ion concentration, and the sensing or indicating electrode provides a voltage that varies with the concentration of the target ion. The voltages are conveyed via a wire medium to an amplifier system and then processed for display or data collection. In certain situations the voltages can be converted to digital values, via an analog-to-digital converter (ADC), for example, and further processed digitally. Characteristics of glass electrode systems that can interfere with measurements include output impedance which is typically on the order of 40 mega ohms ($M\Omega$) to 800 $M\Omega$, noise coupling to the wire medium and expense of the wire medium and the probe. In addition to glass electrodes, there are low performance disposable solutions such as Litmus papers which are passive strips that change color in response to the concentration of a target ion. The litmus paper measurements are not considered precision because, for example, using litmus papers involves a subjective reading of color, the papers themselves can interfere with small samples and it can be difficult to fabricate papers that cover full ion concentration ranges.

OVERVIEW

An ion-sensitive, field effect transistor (ISFET) that is based on an activated FET gate can produce an output source-drain current related to the exponential of pH (Non-Nernstian). This approach can have limitations with charge trapping, hysteresis, and drift. In addition, an ISFET provides an indicating electrode only, and an additional external reference electrode is usually required.

This document describes an integrated ion-sensitive probe. It can include a semiconductor substrate and an attached first passive electrode. The first passive electrode can be configured to contact a solution and to provide a first electrical voltage as a function of a concentration of an ion within the solution. A passive reference electrode can be co-located on the semiconductor substrate. Processing electronics can be integrated on the semiconductor substrate.

This overview is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

FIG. 9E illustrates generally an example substrate including filtered channels.

DETAILED DESCRIPTION

The present inventors have recognized that an ion-sensing system including a passive, solid-state, ion-sensitive electrode can offer a dramatic reduction in size and cost. Compared to other solid-state ion sensing solutions, the present subject matter can also help provide reduced drift. Temperature sensing can be co-located with the ion sensing electrodes, such as to provide an adjunct test that can help accurately report pH, for example. The co-located electrodes and temperature sensor can have very low thermal mass, which can help provide faster temperature equilibrium response, which, in turn, may also help reduce temperature corruption of small samples. An amplifier system and memory can be co-located with the electrodes. This can allow for factory or field calibration of individual electrodes or sensors—which can be difficult in glass electrodes, since the amplifier and sensor are not uniquely coupled. Finally, the much smaller size and cost of the present approach can open up new uses and markets that cannot presently use glass electrodes, for example, the prospect of high performance disposable ion sensing probes.

Figure 1:
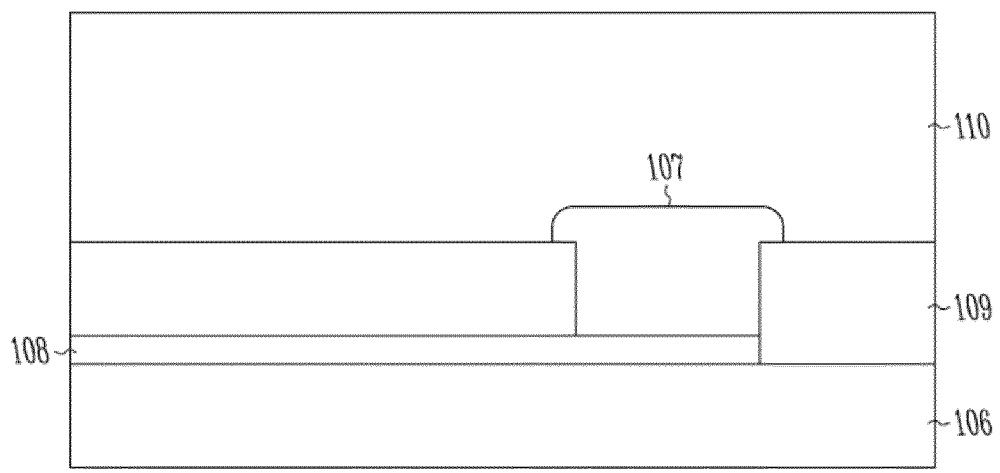
FIG. 1 illustrates generally an example of a passive, solid-state, ion-sensitive electrode.

FIG. 1 illustrates generally an example of a passive, solid-state, ion-sensitive electrode 101. The electrode 101 can include a portion of a substrate 106 upon which an ion-sensitive material 107, an electrical interconnection trace 108, and an insulator 109 can be integrally formed, such as using a semiconductor manufacturing process. For example, the substrate can include a semiconductor substrate such as a silicon-based substrate 106, a glass substrate, or a polymer substrate. By "passive" electrode 101, it is meant that the electrode 101—although integrated with a semiconductor substrate—is not integrated as part of a field-effect transistor (FET) or other transistor structure. Thus, the passive electrode 101 is not part of a transistor gate region, transistor drain region, or transistor source region of a FET (although the electrode 101 may be fabricated on a region of the substrate 106 that can serve as a body terminal or region of a transistor). Therefore, because the electrode 101 is not part of a gate, source, or drain terminal or equivalent terminal of a transistor it can be regarded as a "passive" electrode—even though it may be interconnected (e.g., by an integrated semiconductor wiring trace) to an active transistor device, such as to a gate of a FET input device of an operational amplifier, or the like.

As part of a method of detecting an ion concentration of a solution, the ion-sensitive material 107 can be exposed to and can make contact with the target material or solution sample 110. In an example, the ion-sensitive material 107 can attract or repel ions such that an electrical potential develops at the interface between the sample 110 and the ion-sensitive material 107. The trace 108 can provide a low impedance conductor to provide or communicate the voltage to processing or sensing electronics or circuitry. The insulator 109 can provide a structure to allow the ion-sensitive material 107 to contact the trace 108 and to isolate the trace 108 from the sample solution 110. For example, the ion-sensitive material 107 can include, but is not limited to, iridium oxide, silicon nitride, tantalum pentoxide, or one or more other materials that are reactive to a target ion. For example, the trace 108 can include, but is not limited to, gold, silver, platinum or other conductive material. In certain examples, the insulator 109 can include, but is not limited to, silicon oxide, silicon nitride, polymer, or other insulating material that is substantially impervious to liquid.

Figure 2:
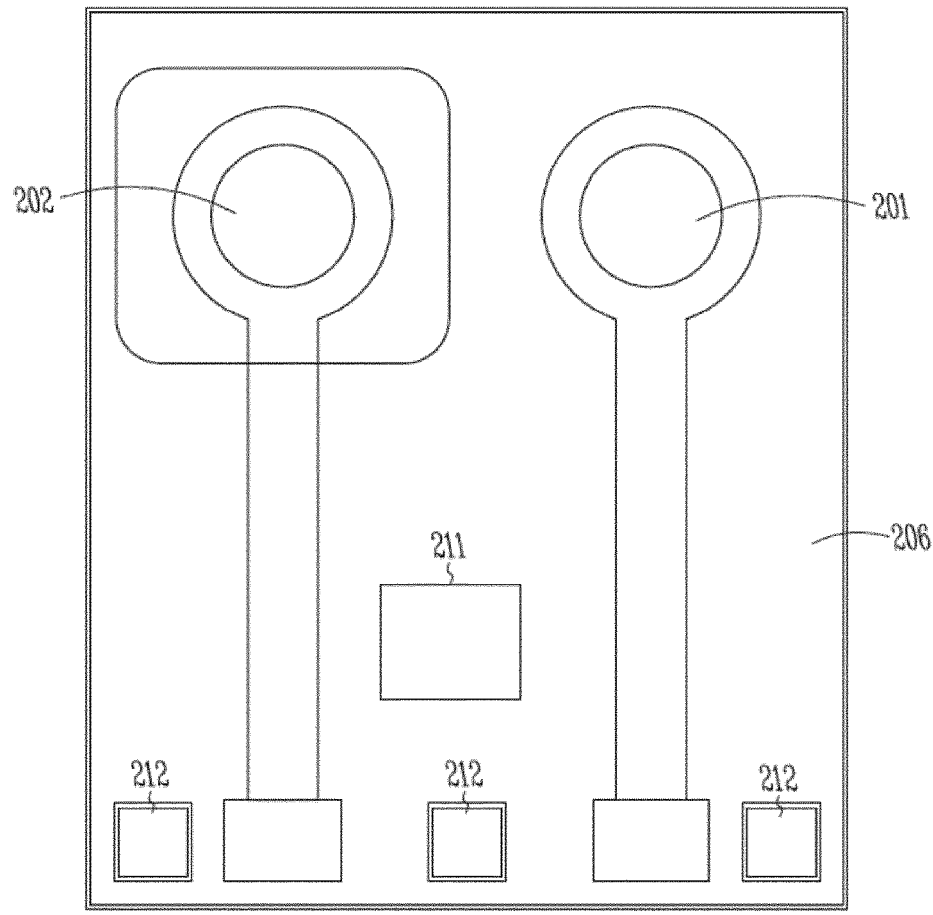
FIG. 2 illustrates generally an example of an integrated solid-state ion probe.

FIG. 2 illustrates generally an example of an integrated solid-state ion probe 203. For example, the integrated solid-state ion probe 203 can include an indicating electrode 201, a reference electrode 202, integrated electronics 211, and a substrate 206, upon which each of the electrodes 201, 202 and the electronics 211 can be formed. In certain examples, the width and length of the integrated solid-state ion probe 203 can be on the order of 2 mm or less. In certain examples, the electronics 211 can include one or more amplifiers for receiving the signals provided by the electrodes 201, 202 and providing amplified signals to electronics coupled to connectors 212 of the probe. An advantage of an integrated solid-state ion probe 203 such as illustrated in FIG. 2 is that the low-power or low-voltage signals provided by the electrodes 201, 202 can be processed or pre-processed with an amplifier co-located with the electrodes 201, 202. This can provide a distinct advantage over certain electronic probes in that the lead length of the conductors to the amplifier is orders of magnitude shorter in length. Smaller lead lengths reduce the susceptibility of the signals from the electrodes 201, 202 from being corrupted by electrical interference and also reduces the susceptibility to stray leakage currents. The electronics 211 can include an amplifier. In some examples, the electronics 211 can include an analog-to-digital converter. In some examples, the electronics 211 can include a wireless transmitter, a wireless receiver, or a combination thereof, such as including a transceiver. In certain examples, the electronics 211 or the connectors 212 of the integrated solid-state ion probe 203, or both, can be sealed from contacting the solution sample being measured.

Figure 3:
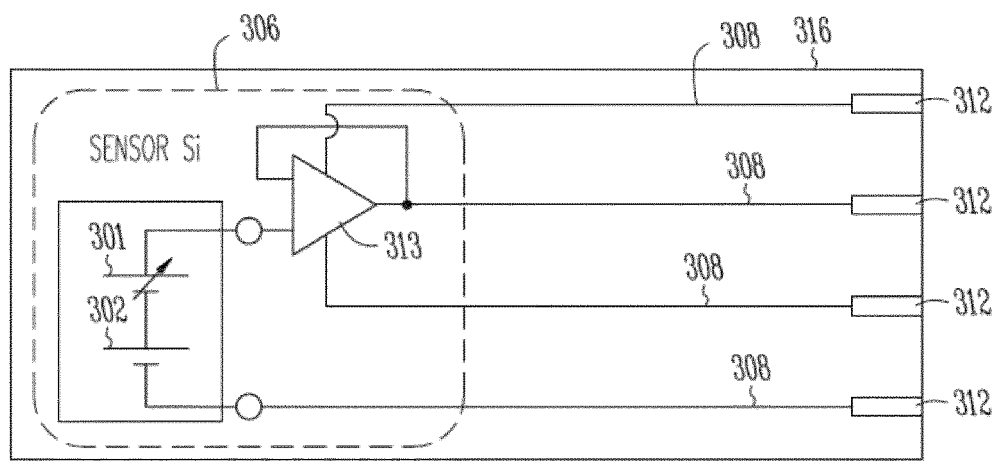
FIG. 3 illustrates generally a block diagram of an example of an ion probe.

FIG. 3 illustrates generally a block diagram of an example of an integrated solid-state ion probe 303. The integrated solid-state ion probe 303 can include a substrate 306 and/or a circuit board 316, or strip that includes or is made of polymer or other material, including traces 308 and terminations 312 for a meter. The substrate 306 can include a reference electrode 302, an indicating electrode 301, and an amplifier 313. For example, the indicating electrode 301 and the reference electrode 302 can be coupled in series between a reference voltage terminal and an input to the amplifier 313. The electrical connection or interface between the indicating electrode and the reference electrode can be formed by an ion exchange interface between the target solution and the reference solution during an ion concentration measurement of the target solution. In FIG. 3, the amplifier 313 can be in a voltage follower configuration. Such a configuration can provide a high impedance amplifier input at which to sense the voltage of the electrodes 301,302 and a low impedance output to efficiently convey a representation of the sensed voltage to a meter device without as much risk of noise corruption as glass probes, for example. Other amplifier configurations integrated with the substrate 306 can be used. Having the amplifier or an amplifier system co-located with one or more electrodes 301, 302 of the integrated solid-state ion probe 303 can significantly reduce the output impedance of the integrated solid-state ion probe 303, such as compared to a glass electrode.

In addition, the integration of the electrodes 301, 302 with a substrate 306, individually or together, or the integration of one or more electrodes 301, 302 and an amplifier 313 or amplifier system on the substrate 306 can open up new uses for such an ion-sensitive probe. For example, the electrodes 301, 302 can be made relatively small, and can provide an accurate ion measurement using a very small solution sample size. The indicating electrode 301 can be formed at the bottom of a small volume vessel, which can also be integrated on the silicon substrate, such that a drop of solution can be contained such as can fully cover the indicating electrode 301 and such as can form a bridge to reference electrode 302 for measurement purposes. The small size format also allows the integrated solid-state ion probe 303 to be used in small areas. Such an integrated solid-state ion probe 303 can also provide accurate ion measurements when submerged in a large volume of solution. Other applications that an integrated solid-state ion probe 303 can make a reality is a disposable or semi-disposable probe. The passive electrode structure as discussed above, as well as the further integration of the reference electrode as discussed below, can be manufactured using techniques for making integrated electronics, which can allow a probe to be manufactured consistently, in large numbers and at a fraction of the cost of other technologies. Such a probe could be regarded as a disposable probe or a single-use probe.

Figure 4:
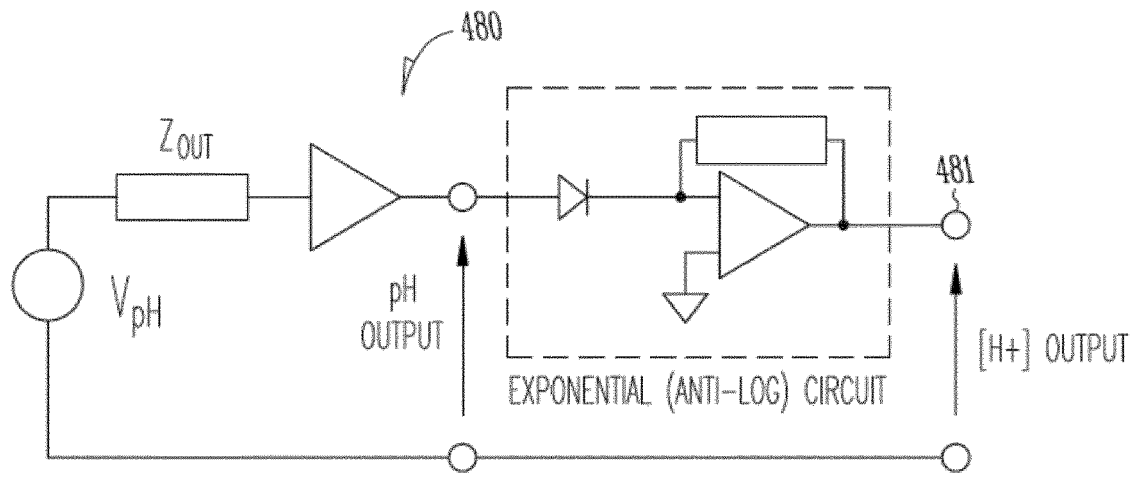
FIG. 4 illustrates generally an example circuit for providing a signal indicative of an $H^+$ ion concentration directly as opposed to a pH indication.

FIG. 4 illustrates generally a circuit 480 that can provide a signal indicative of an ion concentration directly, as opposed to for example, a pH indication. The circuit can include an exponential or anti-log circuit coupled to the output 481, for example. The anti-log circuit can include an amplifier having a non-inverting input coupled to a reference voltage, such as ground, a diode coupled between the output of a pH circuit and an inverting input of the amplifier, and a resistive feedback coupled between the output of the amplifier and the inverting input.

Figure 5A:
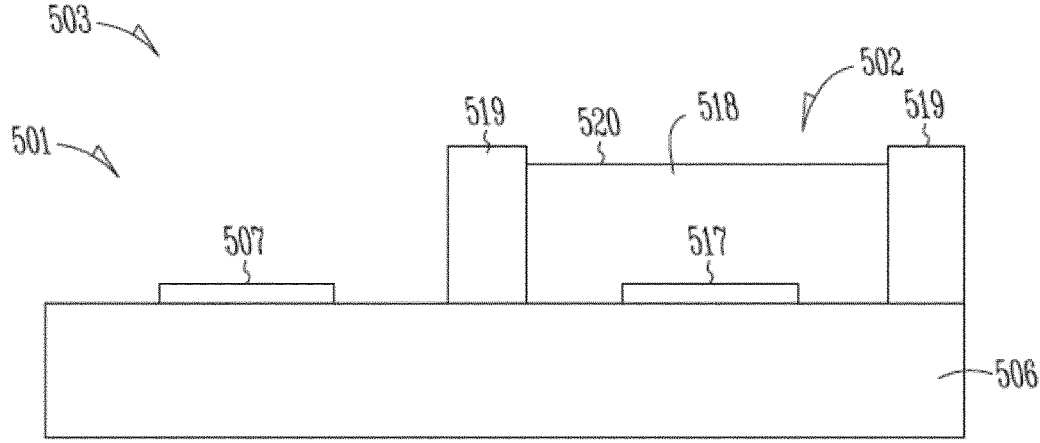
FIGS. 5A and 5B illustrate generally examples of configurations of a reference electrode.
Figure 5B:
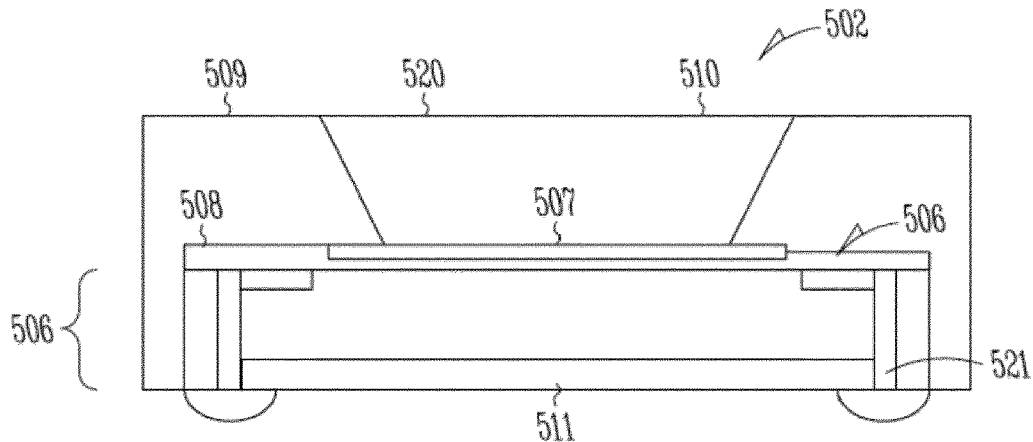

FIGS. 5A and 5B illustrate generally examples of configurations of a reference electrode 502. FIG. 5A illustrates generally a cross section of an example of an integrated solid-state ion probe 503 that can include an indicating electrode 501 and a reference electrode 502. The indicating electrode 501 can include a first ion sensitive material 507 that has an external surface that can contact a target solution. In certain examples, the reference electrode 502 can include a second ion-sensitive material 517 that can be in contact with a reference material 518 having a known or specified ion concentration such that the reference electrode 502 can provide a reference or base voltage. The indicating electrode 501 can be exposed to the material or solution for which an ion measurement is desired. The reference electrode 502 can concurrently be exposed to the material or solution such as to form an electrical connection between the indicating electrode 507 and the reference electrode 502. The reference electrode 502 can provide a reference or base voltage such as by having the second ion-sensitive material 517 contact a reference solution having a controlled ion concentration. In certain examples, the reference electrode 502 can include container including a containment barrier 519 surrounding an exposed surface of the second ion sensitive material 517. The containment barrier 519 can provide a vessel for the reference solution 518. In some examples, a top porous membrane 520 can be coupled to the top of the containment barrier 519, such as can provide a top liquid barrier such that the reference solution 518 can be substantially sealed within a vessel that includes the second ion-sensitive material 517 of the reference electrode, the substrate 506 supporting the electrode, the containment barrier 519, and the top membrane 520. In some examples, the reference solution 518 can include a liquid. In some examples, the reference solution 518 can include a gel, which can be easier to contain for an extended period of time. In certain examples, the reference electrode 502 can include the same ion sensitive material as used in the indicating electrode 501. In some examples, the second ion-sensitive material 517 of the reference electrode 502 can be different than the first ion-sensitive material 507 of the indicating electrode 501. The sensor employs a liquid junction that allows ions to form an electrical connection between the indicating electrode 501 and the reference electrode 502. The liquid junction is an interface between the target solution and the reference solution 518 of the reference electrode 502. The channel or mechanism that allows contact between the reference solution 518 and the target solution can allow electrical conductivity between second ion-sensitive material 517 of the reference electrode 502 and the target solution. The channel or mechanism can include, but is not limited to, the porous or semi-permeable membrane 520 or a micro-pore material, for example. In certain examples, the vessel formed by the containment barrier 519, and the top membrane 520 can entrap the reference solution 518 around the second ion-sensitive material 517 of the reference electrode 502 such as to help ensure that there is a controlled environment around the second ion-sensitive material 517 and that the reference electrode 502 can generate a consistent voltage regardless of the characteristics of the target solution. In certain examples, the vessel can incorporate some type of porous junction that can allow ion flow between the target solution and the reference solution 518, and hence electrical connection, to the target solution, while at the same time reducing or minimizing fluid exchange across the junction.

In certain examples, the membrane 520 can accommodate a needle puncture and can re-seal upon withdrawal of the needle. Such a membrane 520 can allow for filling of the reference electrode vessel with reference solution 518 just prior to using the probe 503 to detect an ion concentration of a target solution. A point-of-use, fillable, reference electrode structure can allow a probe user to store a supply of probes 503 for an extended period of time without risking contamination of the reference solution 518 of each individual probe 503.

FIG. 5B is another configuration of an example reference electrode 502. The reference electrode 502 can include a substrate 506, a first material 508 that is conductive such as gold, an ion-sensitive material 507, packaging material 509, and a reference material 510. The substrate 506 can include a semiconductor substrate and the first material 508 provides traces to route electrical signals to different areas of the substrate 506. The packaging material 509 can protect the substrate 506 and the first material 508, and can provide a vessel for containing the reference material 510. In certain examples, the ion-sensitive material 507 of the reference electrode 502 can provide at least a portion of an interior surface of the vessel. In certain examples, the reference material 510 can be in gel form. In some examples, an upper membrane 520 can extend across the vessel and can couple to the packaging material 509 such as to seal the reference material 510 within the vessel formed by the packaging material 509, the ion-sensitive material 507 and the upper membrane 520. In some examples, the substrate 506 can include active electronics 511 such that one or more signals from the reference electrode 502 can be processed as close as possible to the reference electrode 502. Such approach limits the length of conductive media from the reference electrode 502, and, in some cases, a co-located indicating electrode, that are exposed to potential interfering signals, such as compared to a glass electrode. In some examples, the active electronics 511 can reside on a side of the substrate 506 opposite to that of the ion-sensitive material 507 and one or more signals can be routed to the active electronics 511, such as using one or more through silicon vias (TSVs) 521.

Figure 6A:
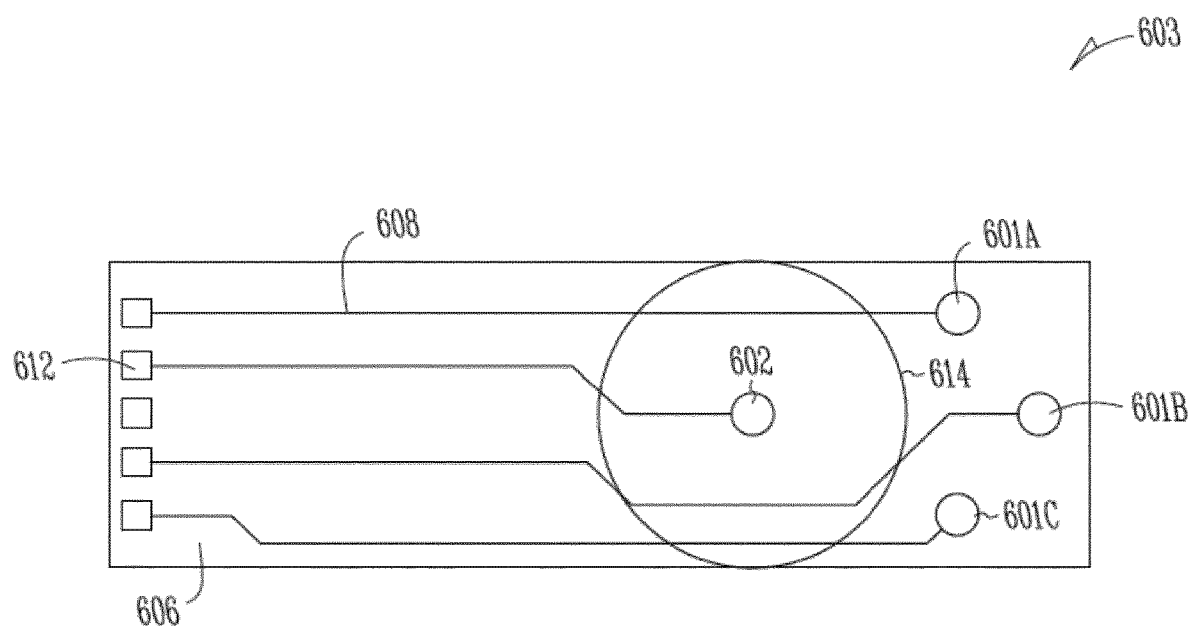
FIGS. 6A and 6B illustrate generally examples of probe layouts that include a reference electrode and one or more indicating electrodes.
Figure 6B:
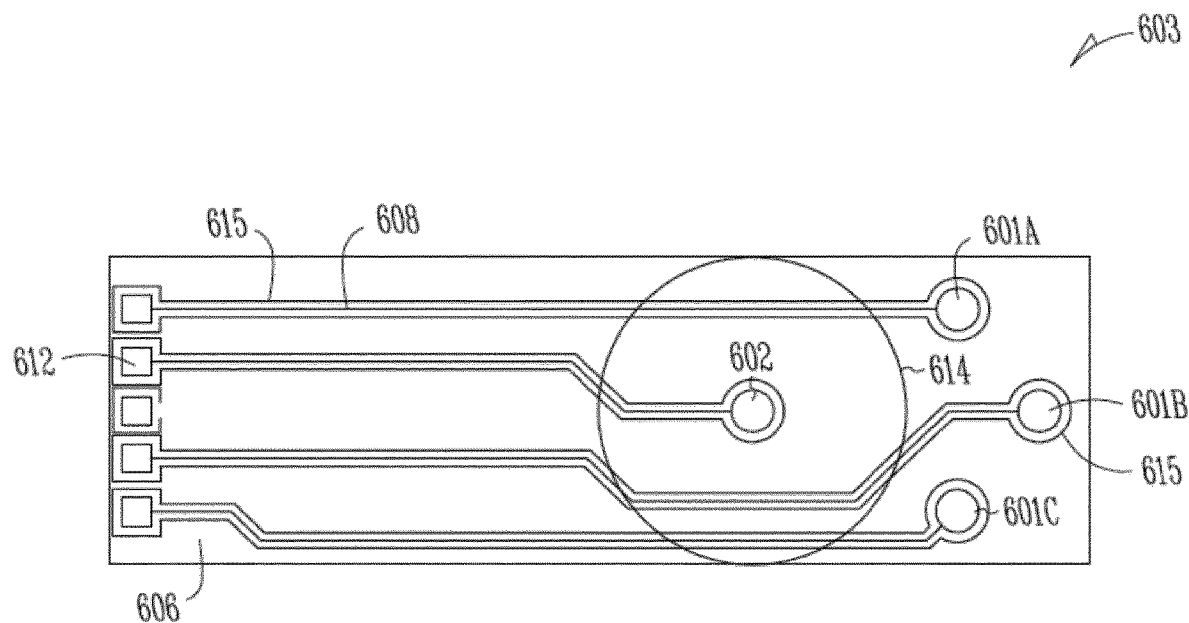

FIGS. 6A and 6B illustrate generally an example of probe layouts 603 that can include a reference electrode 602, and one or more indicating electrodes 601. FIG. 6A illustrates generally an example of a probe layout 603 that can include a reference electrode 602 and multiple indicating electrodes such as three indicating electrodes 601a, 601b, 601c. Each electrode 601x, 602 can be electrically connected to a respective trace 608 of a substrate 606 of the probe layout 603. Each trace 608 routes the voltage or signal of the electrode to a connector 612 of the substrate 606 or some other termination. In some examples, each trace 608 can route the voltage or signal to active electronics that can be integrated with the substrate 606. In some examples, each trace 608 can route the voltage or signal to active electronics integrated or located on an opposite side of the substrate, such as using a TSV. In certain examples, the active electronics can include an amplifier circuit, for example, such as can buffer or convert the signal received via the trace 608 and electrodes 601x, 602 to a more noise immune signal.

In certain examples, the reference electrode 602 can include a well, such as to retain reference material. The probe layout 603 includes a circle 614 indicating a location of a containment barrier, for example, that can form a portion of the vessel. In certain examples, the diameter of the electrodes 601x, 602 can vary, such as depending on one or more of a number of factors, such as can include anticipated environment that the probe is to be used in. For example, if the probe is to be used for measuring very small samples, the electrodes may also be relatively small. In some examples, the electrodes, both reference 602 and indicating 601x, can have diameters that range from <100 micrometers (um) to 1 millimeter (mm) or more. Good results can be attained with electrode diameters of 500 um and 300 um. In certain examples, the diameter of the containment barrier can be between 1 mm and 6 mm, although other diameters are possible.

FIG. 6B illustrates generally an example probe layout 603 having a reference electrode 602 and multiple indicating electrodes such as three indicating electrodes 601a, 601b, 601c, each electrode having an electrode diameter of about 500 um. Each electrode 601x, 602 can be coupled to a conductor or trace 608 of a substrate 606 of the probe layout 603. In addition, each trace 608 and each electrode 601x, 602 can be surrounded by a shield trace 615 of the substrate 606. The shield trace 615 can be coupled to a reference potential such as ground, for example. In some examples, each trace 608 and each electrode 601x, 602 can have individual shield traces 615 capable of being connected to individual potentials or a common potential such as ground. Each shield trace 615 can be arranged to protect the electrode 601x, 602 and the electrode conductor or trace 608 from stray electrical interference such as by routing such interference to ground.

Figure 7:
FIG. 7 illustrates generally an examples of a method of operating an ion-sensitive probe that includes a passive electrode integrated on a semiconductor substrate.

FIG. 7 illustrates generally an example of aspects of a method 700 of operating an ion-sensitive probe that can include a passive electrode integrated on a semiconductor substrate. At 701, a passive ion-sensitive probe integrated on a substrate can contact a solution. At 703, a first voltage of the first passive electrode can be amplified or buffered such as to provide an indicating voltage indicative of an ion concentration of the solution. In certain examples, the amplifier can be integrated on the silicon or other semiconductor based substrate such that the output voltage of the amplifier is significantly more noise immune than the signal taken directly from the passive electrode. In some examples, a reference electrode can be located adjacent the passive electrode on the substrate.

Figure 8A:
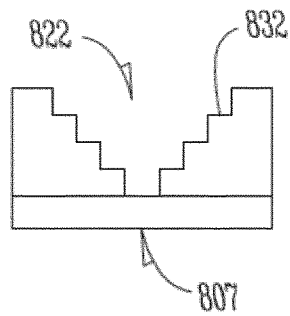
FIGS. 8A and 8B illustrate generally example channels 822 for adjusting fluid flow to underlying layers of an ion sensing system as discussed above.
Figure 8B:
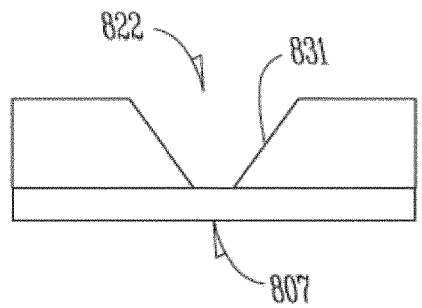

FIGS. 8A and 8B illustrate generally an example of channels 822, such as microfluidic channels, such as for adjusting fluid flow to one or more underlying layers of an ion sensing system such as discussed above. In certain examples, a channel 822 can include sloped sidewalls 831. In some examples, the channel 822 can include stepped sidewalls 832. Such sidewalls 831, 832 can help adjust and provide optimal fluid flow to a passive electrode in certain circumstances. In certain examples, the sloped or stepped sidewalls 831, 832 can form a circular channel leading to an ion sensitive material 807 of a passive ion-sensitive electrode.

As used herein, "microfluidic" describes concepts related to fluid flow through microfluidic channels, or microchannels. Such flow can be characterized by the Reynolds number (Re) defined as, $$Re = LV_{avg}\rho/\mu,$$

where L is the most relevant length scale, μ is the viscosity, r is the fluid density, and $V_{avg}$ is the average velocity of the flow. For many microchannels, L is equal to 4A/P where A is the cross sectional area of the channel and P is the wetted perimeter of the channel. Due to the small dimensions of microchannels, the Re is usually much less than 100, often less than 1.0.

Figure 9A:
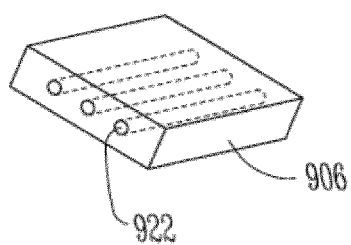
FIGS. 9A-9D illustrate generally example channels that can allow target material or target solutions to be carried to or past a passive, ion-sensitive electrode.
Figure 9B:
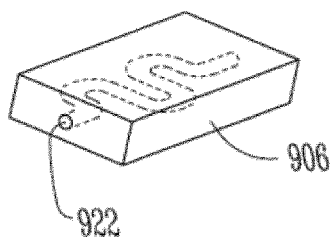
Figure 9C:
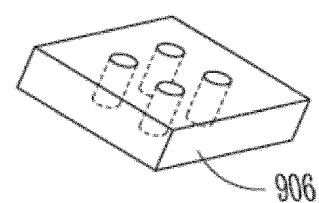
Figure 9D:
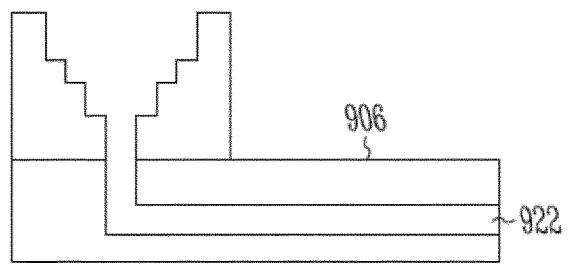

FIGS. 9A-9D illustrate generally examples, which can be used in combination, of one or more microfluidic channels 922 that can allow target material or target solutions to be carried to or past a passive, ion-sensitive electrode. Different forces may be employed to assist the movement of the target solution including, but not limited to, pump force, gravity, wicking, capillary action, other surface tension effect, or combinations thereof. FIG. 9A illustrates an example of lateral microfluidic channels 922 that can be used to move a target solution through a sensor substrate 906, through packaging material of an electrode structure, or through a combination of substrate 906 and packaging material. FIG. 9B illustrates an example of winding lateral microfluidic channels 922 that can move a target solution through a sensor substrate 906, through packaging material of an electrode structure, or through a combination of substrate and packaging material. FIG. 9C illustrates an example of vertical microfluidic channels 922 that can move a target solution through a sensor substrate 906, through packaging material of an electrode structure, or through a combination of substrate and packaging material. FIG. 9D illustrates generally an example of a combination of vertical and lateral microfluidic channels 922 that can be used to move a target solution through a sensor substrate 906, through packaging material of an electrode structure or through a combination of substrate 906 and packaging material.

In certain examples, substrates incorporating microfluidic channels can have openings into which one or more filters 923 or other constructions can be inserted such as to perform or enable a system function (such as separation, filtration etc.). For example, in order to prevent bio-fouling a filter can be inserted, which traps particles of at least a certain size and prevents them from fouling or obstructing material flow to a sensing element.

Microfluidic channels on different substrates can be combined, such as to enable fluid flow and manipulation of different planes. A system can include one or more or a combination of structures for separation, filtration, heat treatment, or magnetic flux manipulation of a target material before target material is delivered to a sensor element. In some examples, gravity can be used when a fluid flows, such as through one or more vias, to a lower layer beneath. In such examples, the via or channel between layers can also contain a filter (or gel or some other material) such as to remove contaminants or can manipulate the fluid in some desired way before the fluid is presented to the sensor element. In some examples, a combination of different microfluidic channels can present the target fluid or target material to the sensing element at a desired rate for optimal efficiency of the system.

FIG. 9E illustrates generally an example of a substrate including filtered channels. In certain examples, the substrate 906 can include one or more microfluidic channels 922 extending laterally through the substrate 906. A via 921 can extend vertically through the substrate 906 and can intersect a channel 922. In certain examples, the via 921 can extend completely through the substrate 906. In certain examples, a filter 923 can be inserted within the via 921. As material passes through the channel 922, the filter 923 can manipulate the material. In some examples, the filter 923 can remove one or more components of the material. In some examples, removed components of the material can exit the filter 923 and pass through the via 921 to another location such as for collection, disposal, recycling, or one or more combinations thereof. In some examples, cross-flow techniques can be employed to remove material from the filter 923.

Figure 9F:
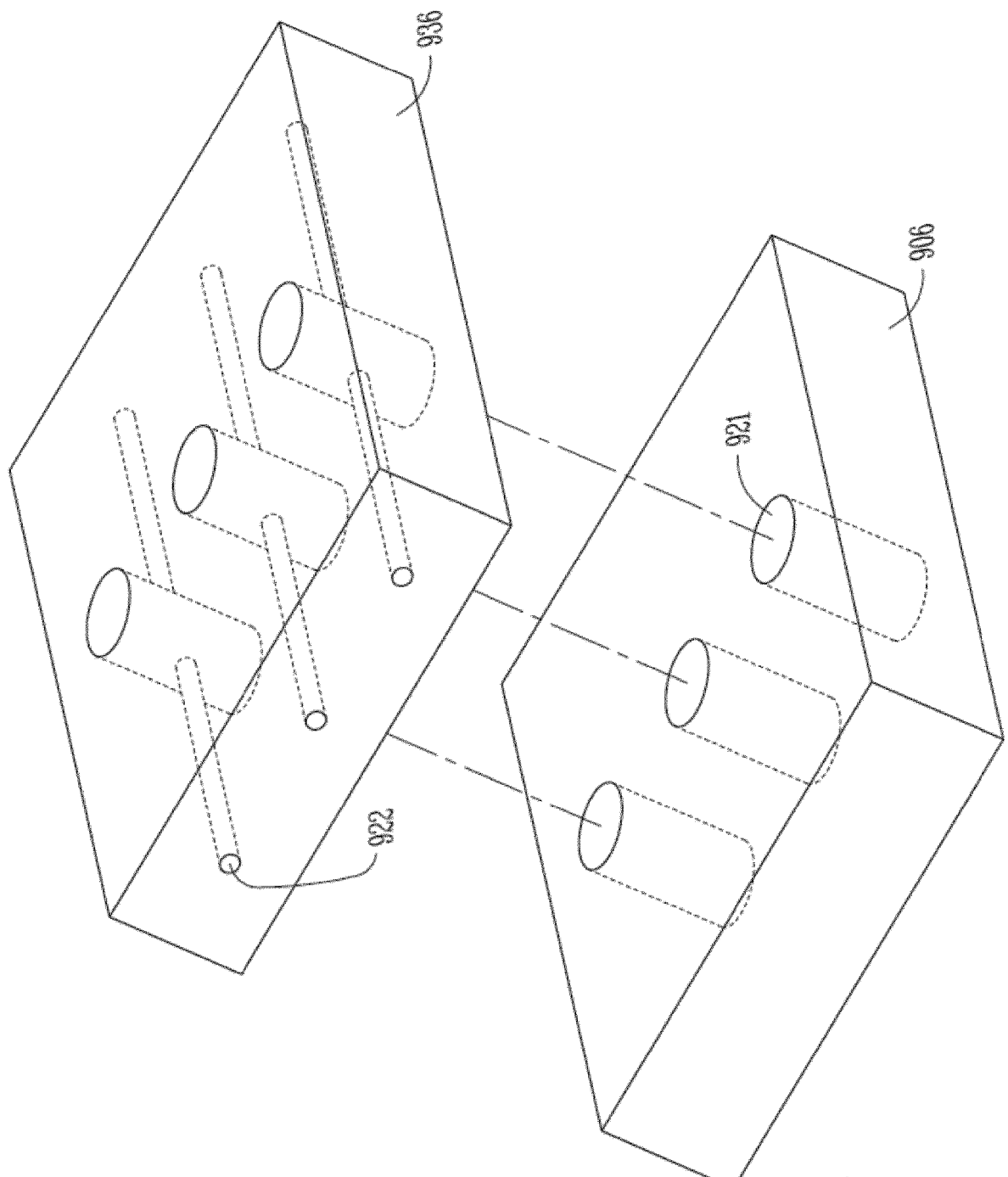
FIG. 9F illustrates generally an exploded view of an example of stacked structures to guide test material, for example, to a passive, ion-sensitive electrode.

FIG. 9F illustrates generally an exploded view of an example of stacked structures to guide test material, for example, to a passive, ion-sensitive electrode. In an example, a structure can include a first substrate 906 and a second substrate 936. The first substrate 906 can include a vertical microchannel 921 and the second substrate 936 can include a corresponding vertical microchannel such that when the first substrate 906 and the second substrate are stacked together, the vertical microchannel 921 of the first substrate 906 aligns with the corresponding vertical microchannel of the second substrate 936 to form a continuous vertical microchannel through the stacked substrates 906, 936. In certain examples, a substrate 936 can include one or more additional microfluidic channels, or microchannels. In certain examples, the additional microchannels can extend in a different direction than the vertical microchannel. In certain examples, an additional microchannel 922 can intersect another microchannel such as a vertical microchannel, as shown with respect to the second substrate 936.

Figure 10A:
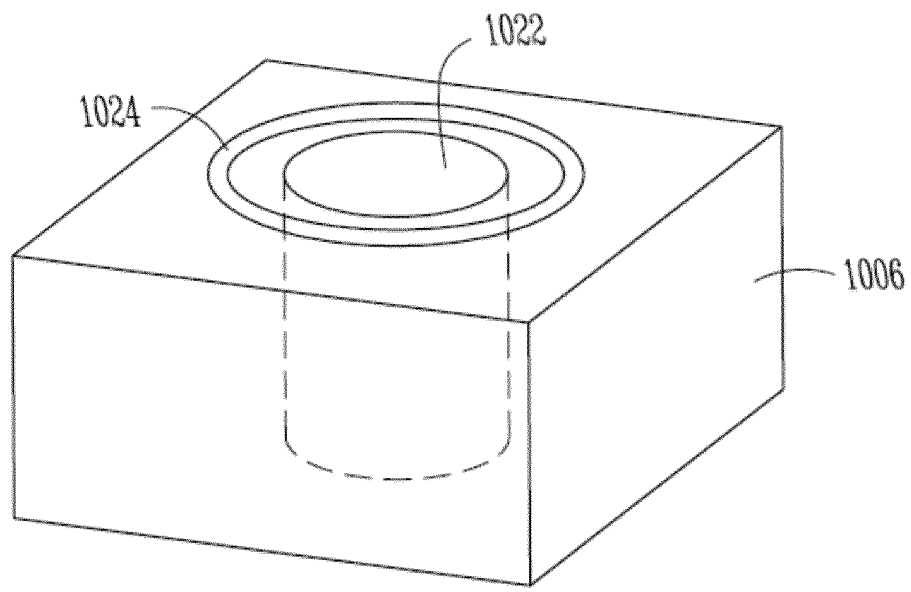
FIGS. 10A-10E illustrate generally example channels that can include a conditioning element adjacent or proximate the channel.
Figure 10B:
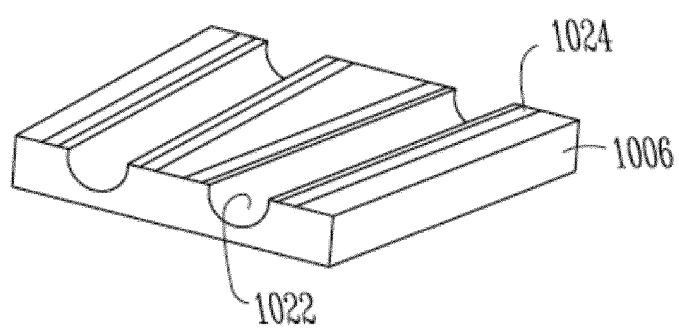

FIGS. 10A and 10B illustrate generally an example of channels 1022 that can include a conditioning element 1024 adjacent or proximate the channel 1022. The conditioning element 1024 can include, but is not limited to, thermal element such as for heating or cooling a surrounding environment, a magnetic element, a microelectromechanical system (MEMS) component, a piezoelectric material or one or more combinations thereof. In certain examples, a thermal element can be used to change the temperature of the material surrounding the channel 1022 and, in turn, influence the temperature or one or more flow characteristics of the material within the channel 1022. In certain examples, a MEMS component can cause vibration in the channel which can influence fluid flow. In some examples, the MEMS component or a piezoelectric material can cause vibration in the channel to help prevent fouling of the channel such as by reducing the chance that fouling material will adhere to the channel walls. In certain example, the MEMS component can include an actuator, moving parts, rotating components, a moveable beam, or other component that when activated can agitate fluid within one or more channels. In certain examples, the MEMS component or a piezoelectric material can occupy a substrate layer and the channels can occupy substrate layers adjacent the substrate layer of the MEMS component.

FIG. 10A illustrates an example of a vertical channel 1022 with a conditioning element 1024 that can be located near an opening of the channel 1022. FIG. 10B illustrates a lateral channel 1022 with the conditioning element 1024 located proximate the channel 1022 and extending with the channel 1022. The specific shape of the incorporated structure can depend on the application and the flow of material. FIG. 10A, for example, shows a channel 1022 or a via through which material can flow vertically and the circular conditioning element 1024 can partially or fully surround the via such that the fluid will flow within its boundaries. Other applications can include a different arrangement (e.g., where a heating element is adjacent to a channel as shown in 10B). Different embodiments can combine different shapes, geometries and sizes in order to deliver an optimal flow rate or condition of material to the sensing element for effective operation of the system.

Figure 10C:
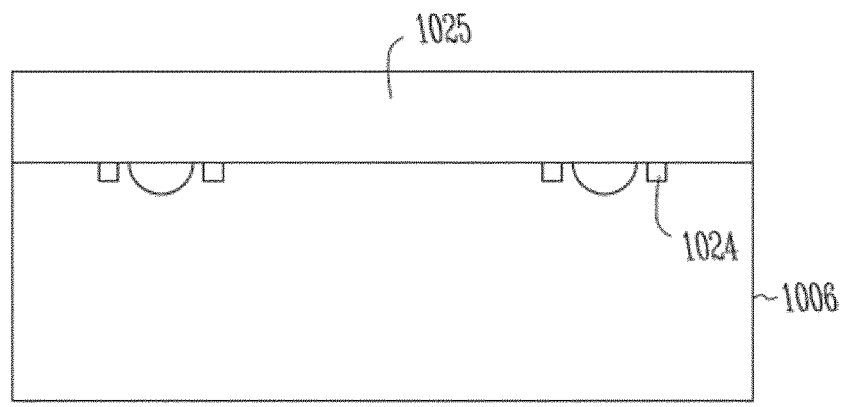
Figure 10D:
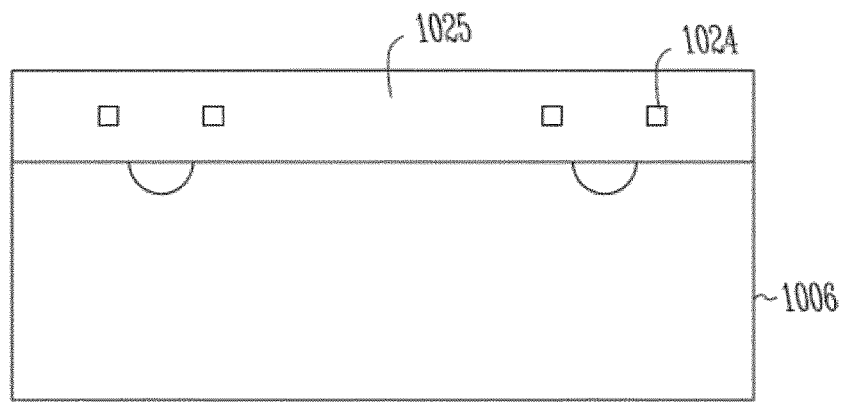

FIGS. 10C and 10D illustrate generally an example of channels 1022 that can be formed using an etched substrate 1006, for example, and a cap 1025. In certain examples, a structure can include a substrate 1006 with one or more grooves and a cap 1025 that can be configured to cover the grooves to form channels 1022. In certain examples, either the cap 1025 or the substrate 1006 can include a conditioning element 1024.

Figure 10E:
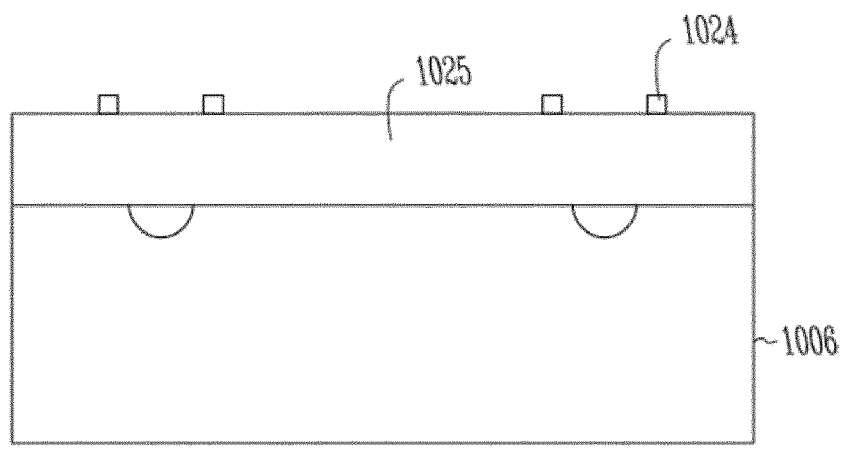

FIG. 10E illustrates generally an example portion of a device that includes open channels 1022 integrated within a substrate 1006, a cap 1025 and a conditioning element 1024 disposed on top of the cap 1025. In certain examples, the conditioning element 1024 can be plated onto the cap 1025, printed onto the cap 1025, sputtered onto the cap 1025, or deposited onto the cap 1025 by another suitable method.

In some examples, a piezoelectric material can be incorporated with microfluidic channels such that the application of a voltage imparts a physical vibration/stress on the channel. Such a vibration or oscillating stress can act as a micropump, moving fluid at a desired rate from one region (within the system) to another. In another example, piezoelectric material can be combined with a channel/via of fluid of specific aperture and length such that the rate of flow of fluid imparts a stress or vibration that provokes a discernible/measurable electrical response (from the piezoelectric material). The electrical response can be analogous to a flow rate or pressure of the fluid (through the channel).

Figure 11:
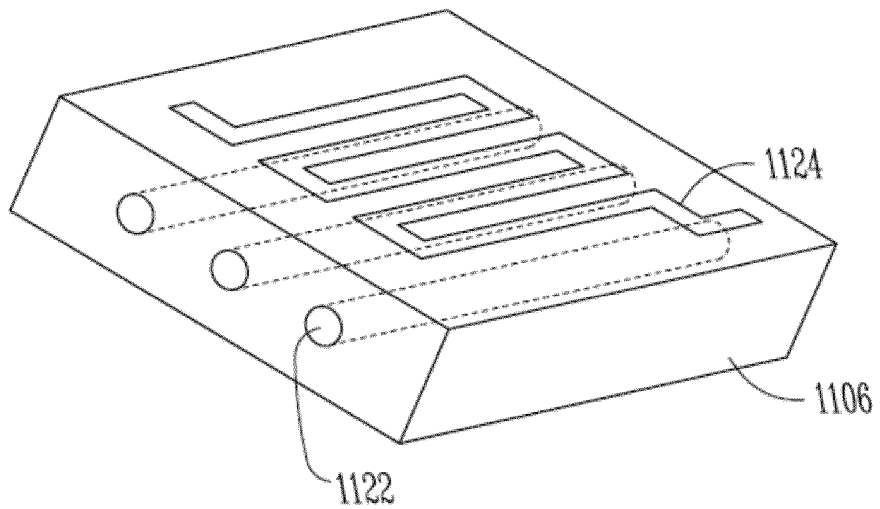
FIG. 11 illustrates generally an example substrate or package material with lateral microfluidic channels and a heating device.

FIG. 11 illustrates generally an example of a substrate 1106 or package material with one or more lateral microfluidic channels 1122 that can extend through the substrate 1106 and have a relatively consistent cross-section area. In addition to the microfluidic channels, the substrate 1106 can include a thermal device 1124. In certain examples, the thermal device 1124 can be used to change the temperature of the material near or surrounding the channel and, in turn, influence the temperature or one or more flow characteristics of the material within the channel 1122. In certain examples, the thermal device 1124 can include a heater, such as a resistive heater, for example. In certain examples, the thermal device 1124 can include a heating element, a piezoelectric element, a magnetic element or a combination thereof.

Figure 12:
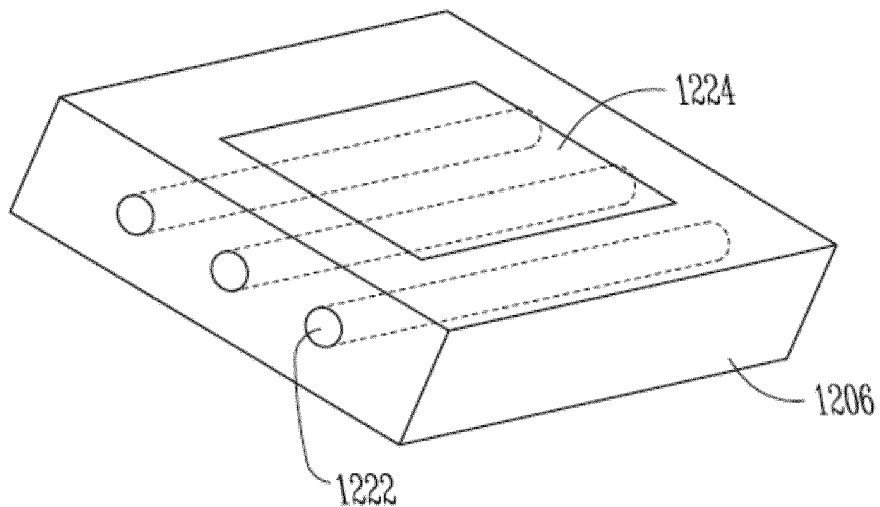
FIG. 12 illustrates generally an example substrate or package material with microfluidic channels and a magnetic device.

FIG. 12 illustrates generally an example of a substrate 1206 or package material with one or more microfluidic channels 1222 that extend through the substrate and have a relatively consistent cross-section area. In addition to the microfluidic channels 1222, the substrate 1206 can include a magnetic material 1224, or a magnetic device. In certain examples, the magnetic material 1224 or magnetic device can be used to change a characteristic of the channel 1222 or one or more flow characteristics of the material within the channel 1222. In certain examples, the magnetic material 1224 can be deposited on a layer of the substrate 1206 that is proximate the one or more channels 1222. In some examples, the thermal device of FIG. 11, or the magnetic material 1224 or magnetic device of FIG. 12, can be formed in a separate substrate that is stacked with the substrate containing the microfluidic channels 1222.

Figure 13A:
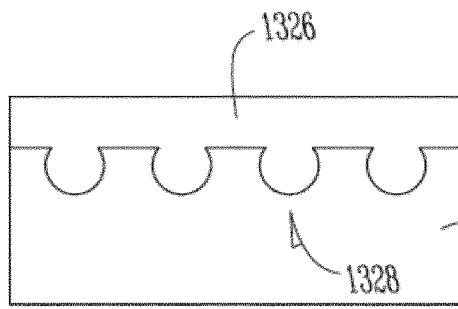
FIGS. 13A and 13B illustrates generally an interface including a substrate and a gel.
Figure 13B:
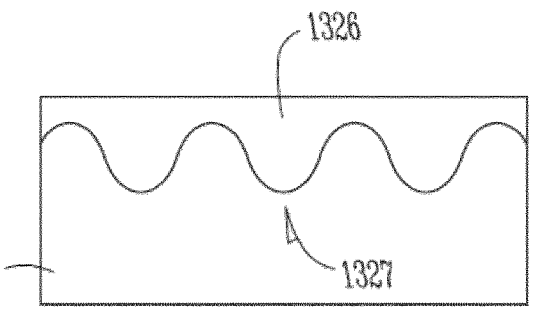

FIGS. 13A and 13B illustrates generally an example of an interface including a substrate 1306 and a gel 1326. The interface can be characteristic of a substrate/gel interface for an ion sensing electrode as discussed above. In certain examples, the substrate 1306 can include grooves that can provide more adhesion or contact area for the gel 1326 compared to a substantially planar substrate surface. In certain examples, the one or more grooves can have a "u" shaped cross-section 1327. In some examples, the grooves can have an "o" shaped cross section 1328 yet still be open to receive the gel.

Figure 14A:
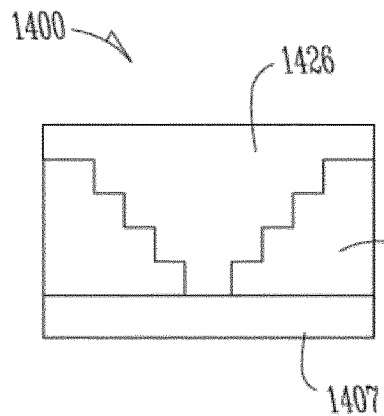
FIGS. 14A and 14B illustrate generally an example electrode structure.
Figure 14B:
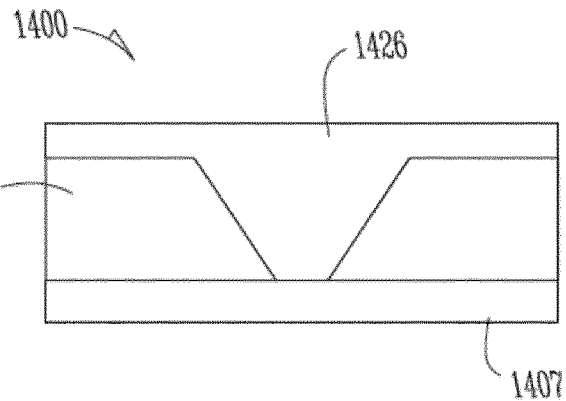

FIGS. 14A and 14B illustrate generally an example of an electrode structure 1400. The electrode structure 1400 can include an ion sensitive material 1407, channel material 1409 with an opening, via, or channel, and gel material 1426, such as can be located within the opening in the channel material 1409. In certain examples, walls of the opening can slant towards each other as the opening progresses toward the ion sensitive material 1407. In some examples, the walls of the opening can slant in a step-wise fashion. In some examples, the walls of the opening can slant in a continuous smooth fashion.

Figure 15:
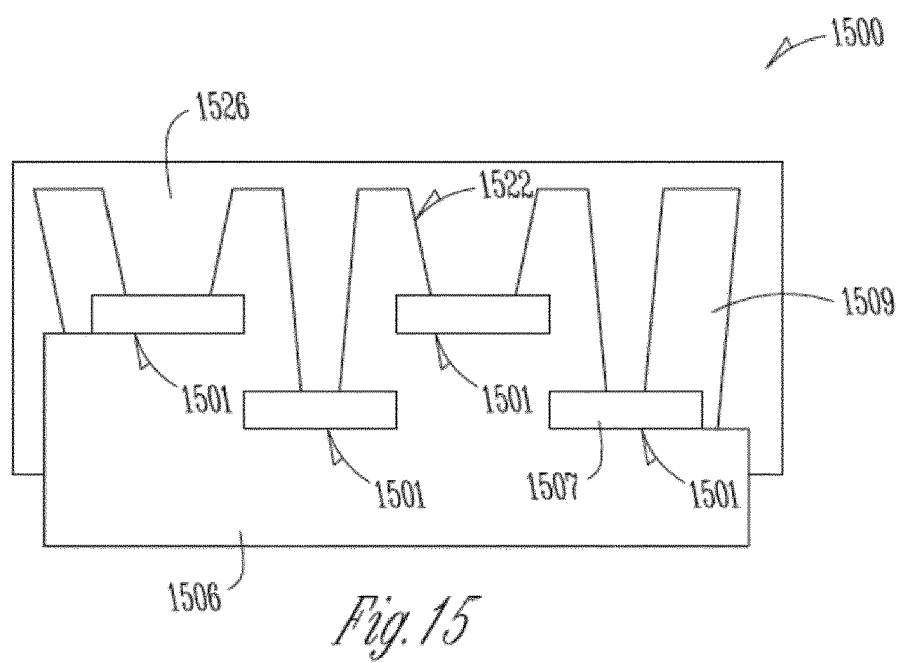
FIG. 15 illustrates generally an example electrode structure including multiple electrodes in a common substrate.

FIG. 15 illustrates generally an example of an electrode structure 1500 including multiple electrodes 1501 in or integrated on a common substrate 1506. Each electrode 1501 can include an ion sensitive material 1507 located at the bottom of an opening 1522, via, or channel formed within a channel material 1509. In certain examples, the ion sensitive material 1507 of one electrode can be located at a different depth within the common substrate 1506 than the ion sensitive material of a second electrode. In some examples, the ion sensitive material of a third electrode can be located at a different level within the substrate than the one electrode or the second electrode. In certain examples, one or more openings of each electrode can be filled with gel 1526. In certain examples, an electrode structure having the ion sensitive material at different levels within the substrate can allow the structure to have a higher area density of electrodes compared to other electrode configurations.

Figure 16A:
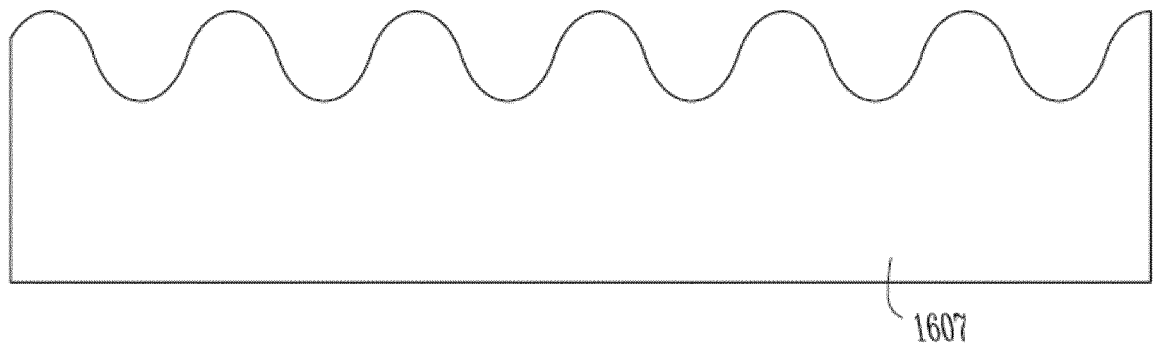
FIG. 16A illustrates generally an ion-sensitive material having a surface topology for increased surface area.
Figure 16B:
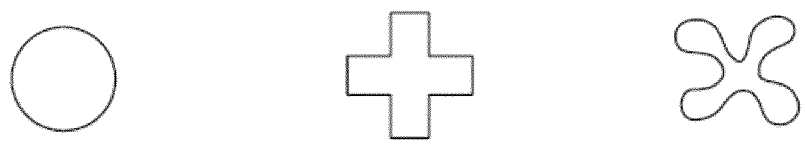
FIG. 16B illustrates alternative shapes of ion-sensitive material that can be exposed in an electrode.

FIG. 16A illustrates generally an example of an ion-sensitive material 1607 having a surface topology for presenting increased surface area, such as by providing a surface texturing or varying surface topology. FIG. 16B illustrate, in plan-view, a non-exclusive set of shapes for the ion-sensitive material that can be exposed in an electrode. In some examples, some shapes can allow for increased surface area or increased electrode density compared to other shapes, such as described above and below.

Figure 17A:
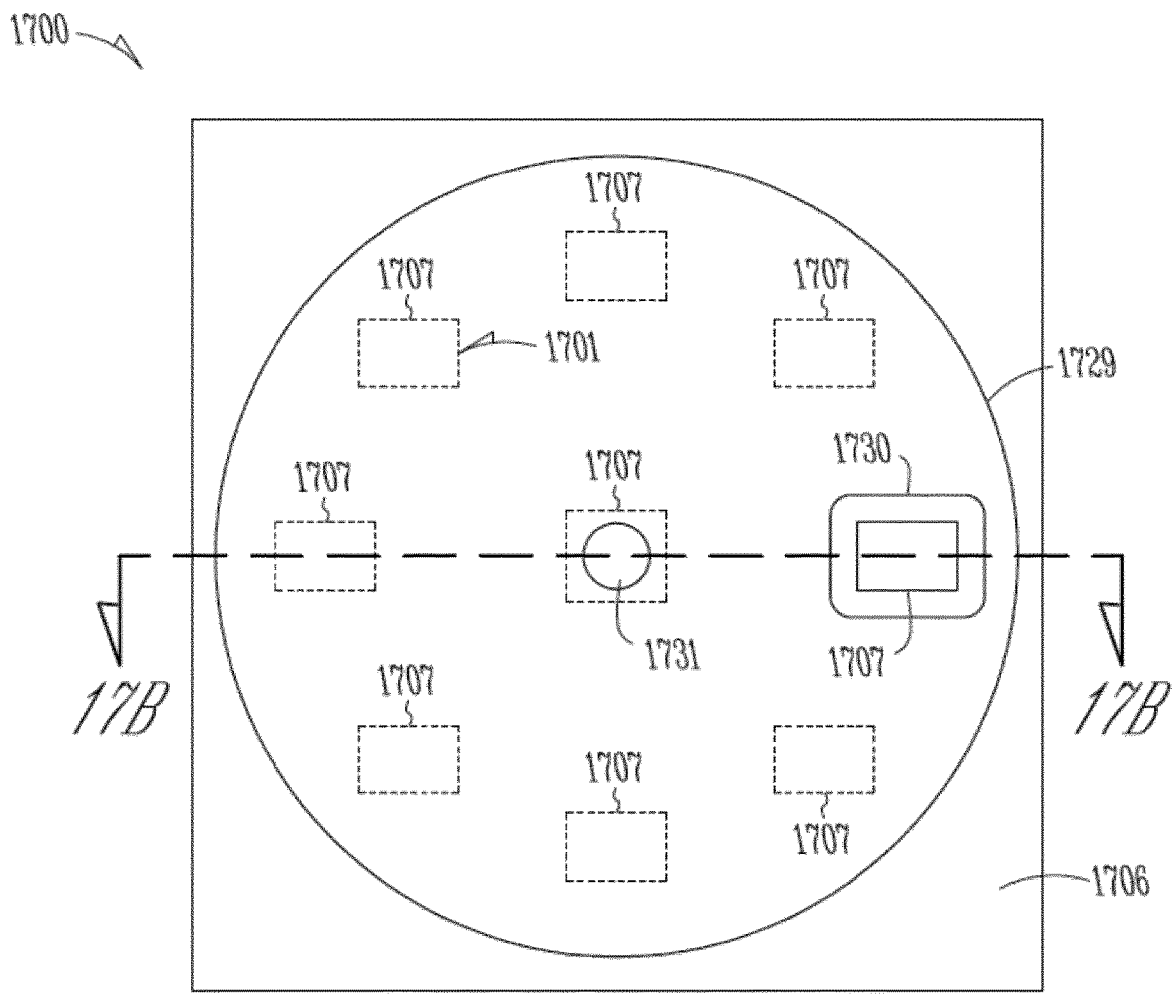
FIGS. 17A and 17B illustrate generally a sensor according to various embodiments of the present subject matter.
Figure 17B:
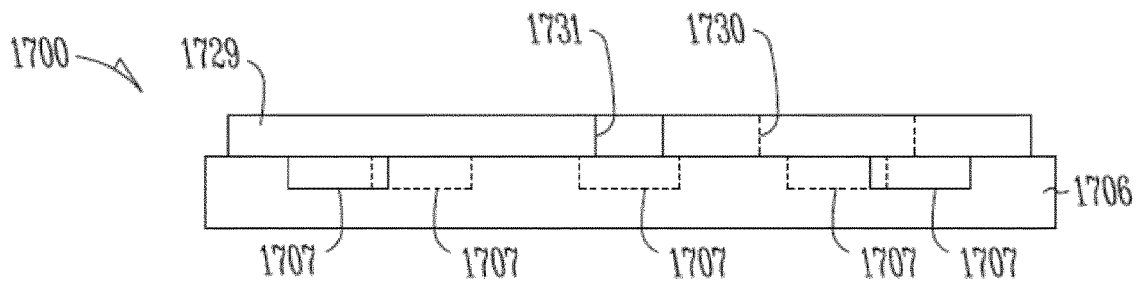

FIGS. 17A and 17B illustrates generally an example of a sensor 1700 according to various embodiments of the present subject matter. The sensor 1700 can include a substrate 1706 with multiple ion sensing electrodes 1701, a mechanical barrier 1729, and a connector 1731, such as coupling the mechanical barrier 1729 with the substrate 1706. In certain examples, the electrodes 1701 can include an ion-sensitive material 1707 such as can be configured to contact a test substance and provide an indication of concentration of a particular ion in the substance. In certain examples, the barrier 1729 and the connector 1731 can be positioned to isolate the electrodes 1701 from an external environment, such as an external environment that includes the test substance. In addition, the mechanical barrier 1729 can include an opening 1730. The opening 1730 can be rotated, in cooperation with the connector 1731, to a number of positions. In a first optional position, the opening 1730 can be positioned to isolate all of the electrodes 1701 from the external environment. In a second position, the opening 1730 can expose one of the electrodes 1701 to the external environment. After a first interval of time, the opening 1730 can be rotated or slid to expose a second one of the electrodes 1701 to the external environment. In certain examples, the sensor 1700 can provide a single package that allows a user to monitor evolution of an ion concentration over time. In addition, new, fresh electrodes can easily be enabled for sensing as an in-use electrode approaches the end of the electrode's useful life.

Figure 18A:
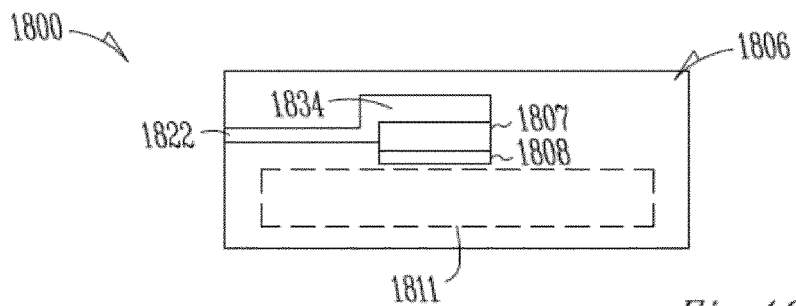
FIGS. 18A-D illustrate generally example semiconductor electrode structures that incorporate a conduit for target material to reach or pass by one or more electrodes.

FIGS. 18A-18D illustrate generally various example configurations of electrode structures 1800 according to the present subject matter. FIG. 18A illustrates generally an example of a semiconductor electrode structure 1800. The structure 1800 can include one or more assemblies. As part of a build-up process to construct an electrode structure 1800, channels 1822 or vias 1821 can be incorporated to enable fluid to flow within or through the electrode structure 1800. Certain examples can include one or more openings or conduits to allow material such as a fluid, external to the system, to flow to the ion sensitive material 1807 of an electrode 1801 or to inhibit or prevent air or gas from getting trapped near an electrode 1801. Depending on the external media being targeted, the channels 1822 can be constructed to optimize the path to the ion sensitive material 1807 of an electrode 1801. In certain examples, the channels 1822 incorporated with the system can be constructed in a manner to transport the fluid from an external system to the ion sensitive material 1807 of an electrode 1801.

In certain examples, the electrode structure 1800 of FIG. 18A can be a reference electrode. When the sensor including the reference electrode structure 1800 is ready to be used, the reference electrode structure can be subjected to a vacuum environment to remove any air or other gases from the reference electrode chamber 1834. The reference electrode structure 1800 can then be submerged in reference material and the vacuum can be released. Upon release of the vacuum, the reference material can fill the reference electrode chamber 1834 to form a complete reference electrode. Such a structure and method can facilitate lengthy storage of sensors without risk of contamination of the reference material or some other kind of deterioration of the reference electrode during storage compared to storing the sensor with the reference material already in the chamber of the reference electrode.

Incorporating additional sensing elements, smart circuitry, or passive components within the substrate 1806 can enable multiple function sensing systems. An example of added functionality to a sensor can include one or more of processor, communication circuitry, inductive coils, or RFID structures. In an example, a multiple function sensing system can detect certain ions, analyze the ion concentration, and wirelessly communicate information on detection of one or more materials or when respective threshold levels of certain materials are detected by the ion sensitive material 1807 of an electrode 1801.

Figure 18B:
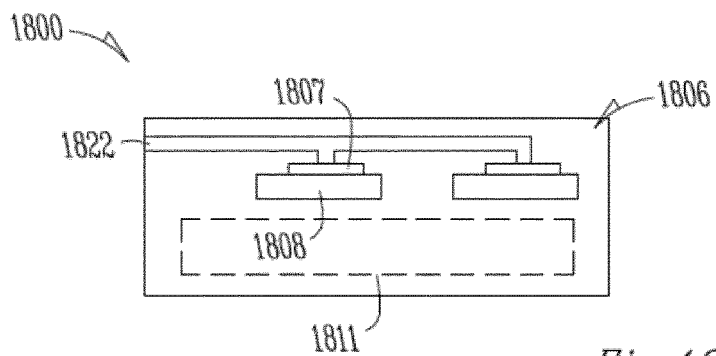
Figure 18C:
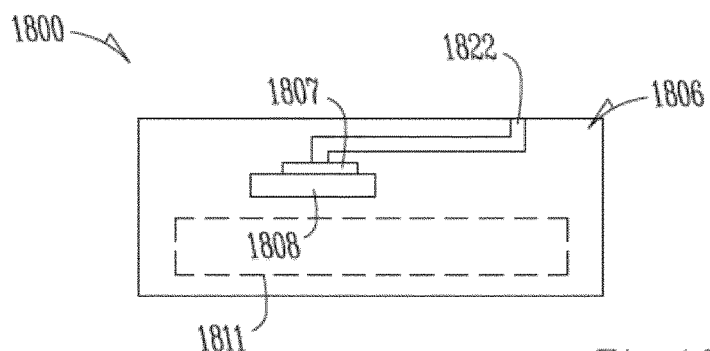
Figure 18D:
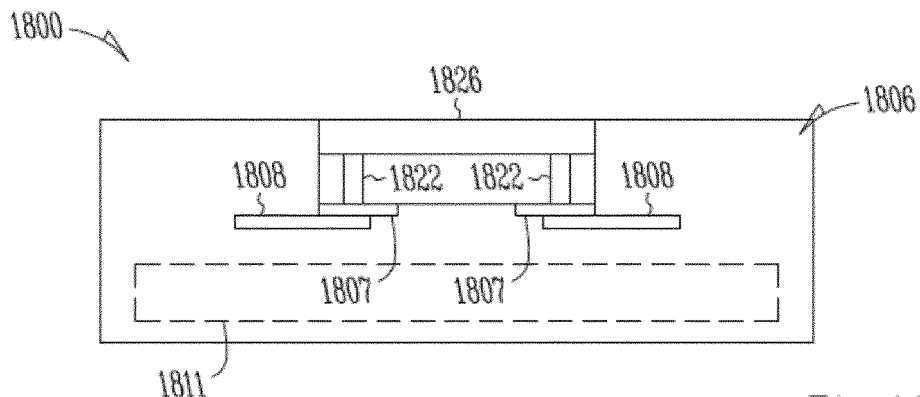

In an example, the structure 1800 can includes a first assembly including processing electronics 1811 and a second assembly including an electrode for sensing an ion concentration in a target material. In certain examples, the second assembly can include one or more lateral channels 1822 to provide passage of the target material to the electrode. In certain examples, the electrode can include an ion-sensitive material 1807 such as can be disposed on a conductive trace 1808. In some examples, a cavity 1834 can be located above the sensing element 1807. In some examples, a chamber 1834 or channel located above the sensing element 1807 can contain a gel, fluid, filter, or a combination thereof, such as to increase or optimize sensitivity of the electrode 1801 or fluid flow to the electrode 1801. In certain examples, the lateral channels 1822 can provide the target material to more than one electrode 1801, such as illustrated in FIG. 18B. FIG. 18B illustrates generally one or more microfluidic channels 1822 incorporated in an integrated electrode assembly that can provide a conduit for the target material to reach or pass by two electrodes 1801. In certain examples, lateral channels 1801 can be combined with vertical channels, or vias 1821, such as to provide a route for the target material to or from the electrode such as illustrated in FIG. 18C. FIG. 18C illustrates generally an example of a microfluidic channel 1822 incorporated in an integrated electrode assembly 1800 that includes portions that route the target material both laterally and vertically through the assembly structure. In each example of FIGS. 18A and 18B, the microfluidic channels can be fabricated with the layers that make up the integrated electrode 1801. In certain examples, the microfluidic channels 1822 can be fabricated using ceramic, glass reinforced laminate, or one or more other materials suitable for electrical connections and the formation of channels or grooves. FIG. 18D illustrates generally an example of a semiconductor electrode structure with a large opening, such as to facilitate more than one electrode 1801. In certain examples, a gel 1826 or a filter can be located in the large opening and each electrode can include a vertical microchannel 1822 or via such as to allow the gel or a target material to contact the ion-sensitive material 1807 of the corresponding electrode 1801.

In certain examples, filters, gels, or semi-permeable membranes can be added to the channels 1822 such as to increase or optimize the efficiency of the sensor. For example, in harsh environments or where there are many contaminants, the sensor can be protected from bio-fouling such as by using a filter, gel, semi-permeable membrane, or a combination thereof. In some examples, the filters, the gels, or the membranes, can be specifically constructed to inhibit or prohibit the ingression of certain materials—such that specific materials can be targeted. In an example, a filter can be constructed [aside from mechanical protection] such that material of only a certain particle or molecule size can permeate through the filter to the sensor.

In some examples, a system can incorporate multiple sensors with the capability of using different combinations of filters, gels, and membranes (constructed to optimize efficiency and also target different external media e.g., different gases, pressure, and gas, ionic contaminants etc.). In certain examples, such as those shown in FIGS. 18A-18C, one or more additional microchannels may be employed such as to allow gas or air to escape the microchannel guiding the test material.

Figure 19A:
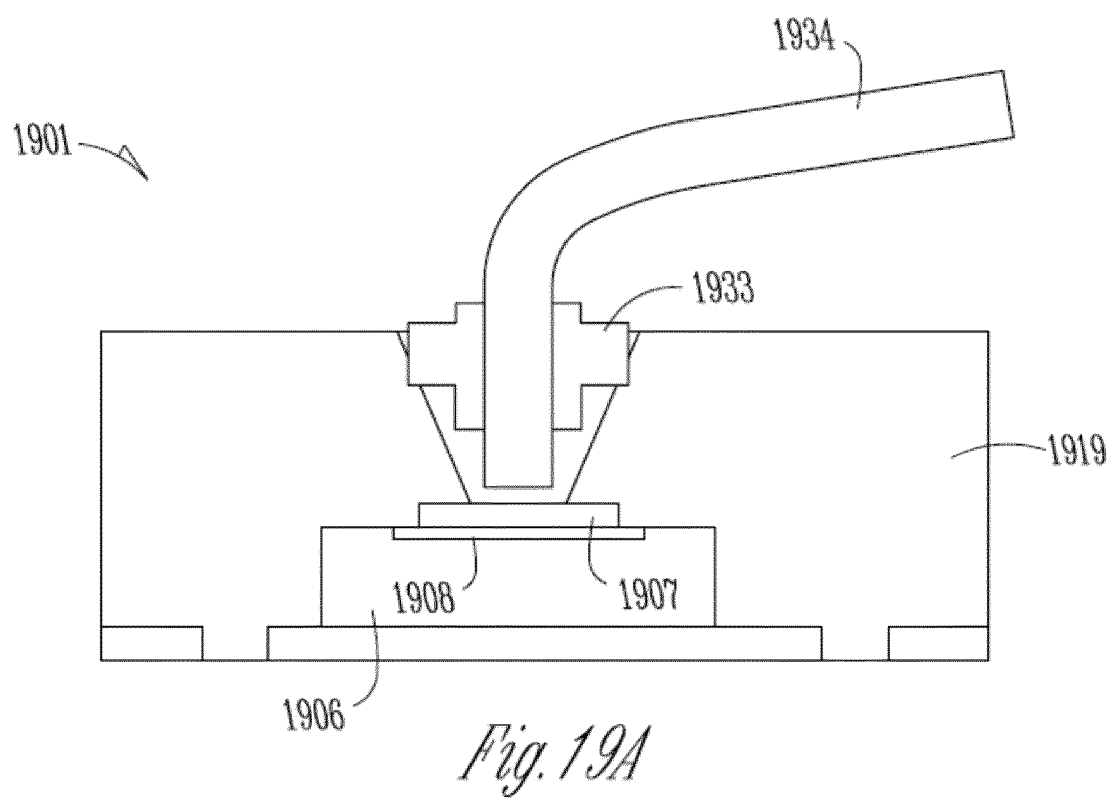
FIGS. 19A and 19B illustrate generally example ion sensor assemblies including connectors such as conduits and tubes.
Figure 19B:
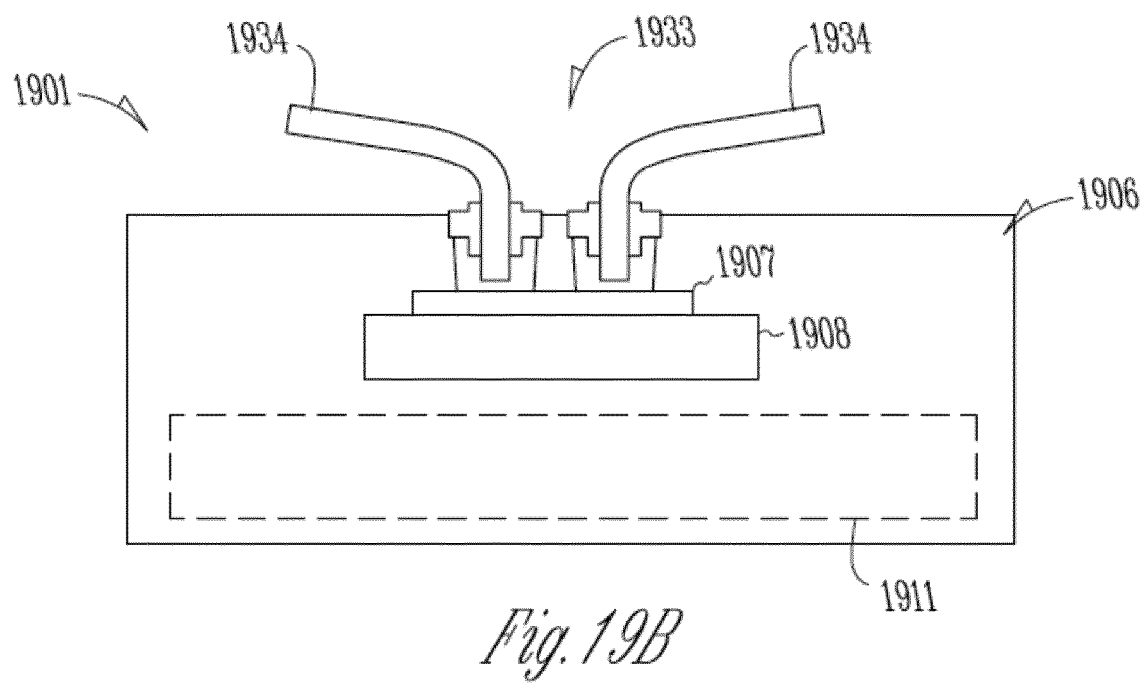

FIGS. 19A and 19B illustrates generally an example of an ion-sensitive electrode 1901 including connectors 1933 to target material media such as using one or more conduits or tubes 1934. In an example, an ion-sensitive electrode 1901 can include a substrate 1906, ion sensitive material 1907, a conductive trace layer 1908, and an optional package layer 1919 having an opening 1922 such as to accommodate coupling of media for guiding flow of a target material to or from the ion sensitive material 1907. In some examples, the package layer material 1919 can include one or more contours or surface features such as to allow a connector 1933 of the media to be securely fastened to the opening 1922. In some examples, the package layer 1919 can include a coupler to allow a securely fastened media to be replaceably decoupled from the package layer material 1919 at the opening. In some examples, the substrate 1906 can include integrated electronics 1911 for processing signals generated using the ion-sensitive material 1907.

Figure 20:
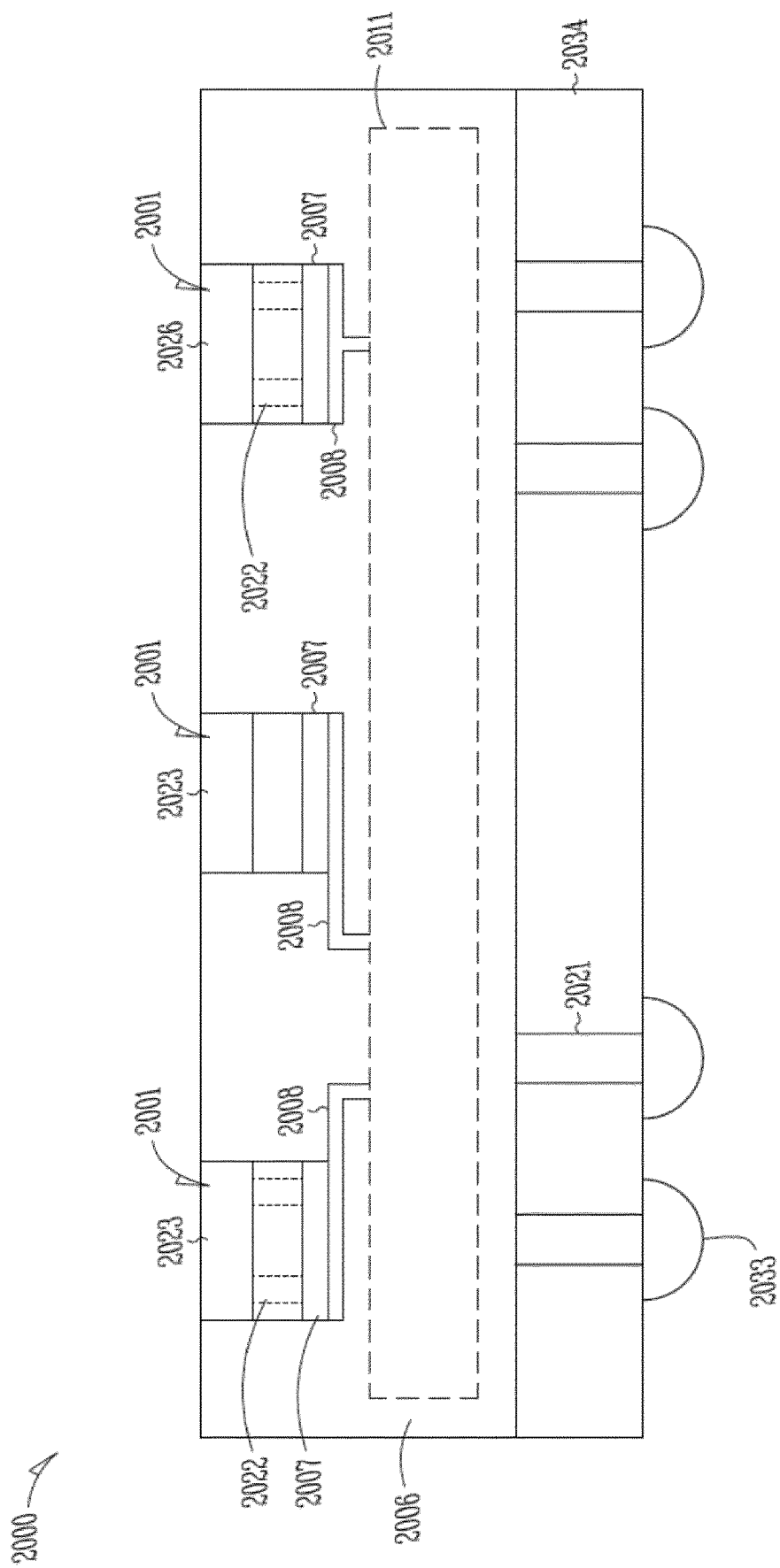
FIG. 20 illustrates generally an ion sensor assembly with multiple sensing electrodes or elements.

FIG. 20 illustrates generally an example of an ion sensor structure 2000 with multiple sensing electrodes 2001 or elements. The ion sensor structure 2000 can include a substrate 2006, processing electronics 2011 integrated with the substrate, and a plurality of sensing electrodes 2001, where one or more of the electrodes includes a passive ion-sensitive material 2007 coupled to a metal trace 2008. In certain examples, each electrode 2001 can be configured to sense a particular ion. In some examples, one or more electrodes 2001 can be configured to sense a first ion and one or more other electrodes 2001 of the assembly can be configured to sense a second ion. In some examples, a first electrode 2001 of the ion sensor structure 2000 can be configured to sense a first ion within a first concentration range and a second electrode 2001 of the ion sensor structure 2000 can be configured to sense the ion within a second concentration range. In certain examples, each or any of the electrodes 2001 can be configured to sense an ion concentration according to the ion type, the ion concentration, the pressure of the material, or one or more combinations thereof.

In certain examples, the electrode structure can include an opening to allow a material to access the passive ion-sensitive material 2007. In some examples, a filter 2023 or a gel 2026 can be placed in the opening such as to regulate a particular ion. In certain examples, the opening can include substrate material having a via or microchannel 2022 guiding material to the passive ion-sensitive material 2007. In some examples, the opening can include the vias or microchannels such as those shown in FIGS. 8A, 8B, 9A-9F, 10A-10E, 11 and 12.

In certain examples, the processing electronics 2011 can include an application specific integrated circuit (ASIC) die to be used with customized sensing substrates depending on the specific application. Customized systems on a chip can be constructed using an ASIC, with customized substrates mounted on top of the ASIC that can allow for various combinations of sensors, sensor arrays, processing circuitry, discrete components etc. as desired.

In certain examples, the ion sensor structure 2000 can optionally include one or more thru-silicon-vias (TSVs) 2021 within the substrate 2006 or within a second substrate 2034 such as can allow the ion sensor structure 2000 to be electrically or mechanically coupled to another package, such as using a coupler, such as can include one or more solder balls 2033 or connection pins for example.

Figure 21:
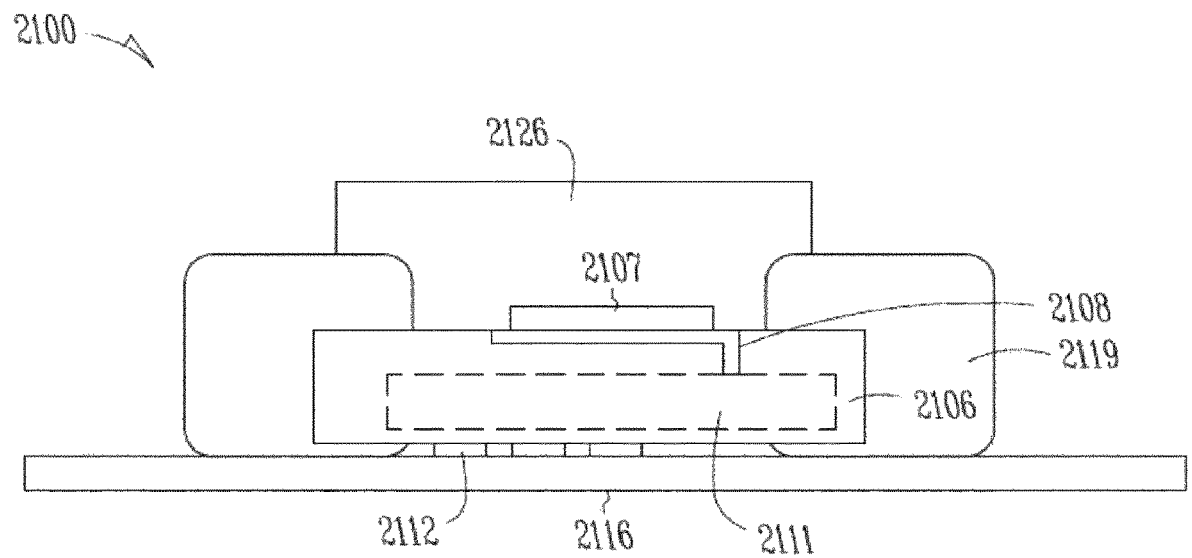
FIG. 21 illustrates generally a cross-section view of an example electrode structure for an ion sensor.

FIG. 21 illustrates generally a cross-section view of an example of an electrode structure 2100 for an ion sensor. The electrode structure 2100 can include a substrate 2106, ion sensitive material 2107, electrically conductive trace 2108, packaging material 2119, and one or more signal terminations 2112. In certain examples, the ion sensitive material 2107, the electrically conductive trace 2108, routing structures and processing electronics 2111 can be integrated with the substrate 2106 such as shown for example in the other figures of the present application and in particular FIG. 5B. In certain examples, the package material 2119 can be fabricated to hold the substrate, such as to form a cavity or via to contain or route a target material, and to seal the signal terminations 2112 from an external environment. In certain examples, the cavity or via can be filled with a gel 2126 or reference material. In certain examples, a seal can be formed in conjunction with a surface of a circuit board 2116 or other device with which the sensor substrate 2106 is terminated.

Figure 22:
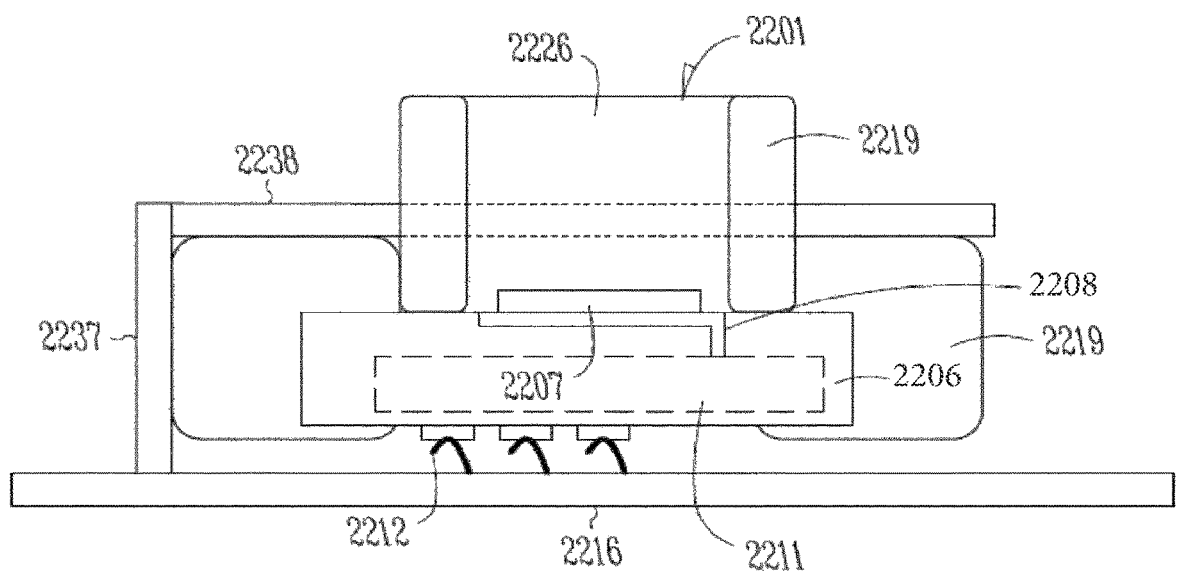
FIG. 22 illustrates generally a cross section view of an example electrode structure and system for an ion sensor.

FIG. 22 illustrates generally a cross section view of an example of an electrode structure 2201 and system for an ion sensor. The electrode structure 2201 can include a substrate 2206, ion sensitive material 2207, an electrically conductive trace 2208, packaging material 2219 and one or more signal terminations 2212. In certain examples, the ion sensitive material 2207, conductive traces 2208, and routing structures and processing electronics 2211 can be integrated with the substrate 2206 as shown for example in the other figures of the present application and in particular FIG. 5B. In certain examples, the package material 2219 can be fabricated to hold the substrate, and to form a cavity or via to contain or route a target material. In certain examples, the cavity or via can be filled with a gel 2226 or reference material.

In certain examples, the electrode structure 2201 is configured to provide a convenience in that the structure 2201 can be easily replaced in an ion sensing system. In certain examples, the system can include a sensing element holder into which the electrode structure can be easily inserted and removed. In some examples, the sensor element holder 2238 can include a circuit board 2216 or other material with one or more mating terminations 2212 and a guide housing 2238. The circuit board 2216 or other material can include one or more mating terminations such as for routing respective signals or power to and from the electrode structure 2201. The guide housing 2238 can be mechanically coupled to the circuit board 2216 or other material and can include an end stop 2237. The guide housing can be used to guide an electrode structure over the mating terminations as the electrode structure is inserted into the guide housing. The end stop can provide a mechanical stop to the insertion motion such that the position of the terminations of the electrode structure are aligned with the mating terminations of the circuit board or other material. In certain examples, the mating terminations can be configured to deflect upon insertion of the electrode structure and to apply, for example, a spring force against the terminations of the electrode structure when the electrode structure is fully inserted in the guide housing.

Figure 23:
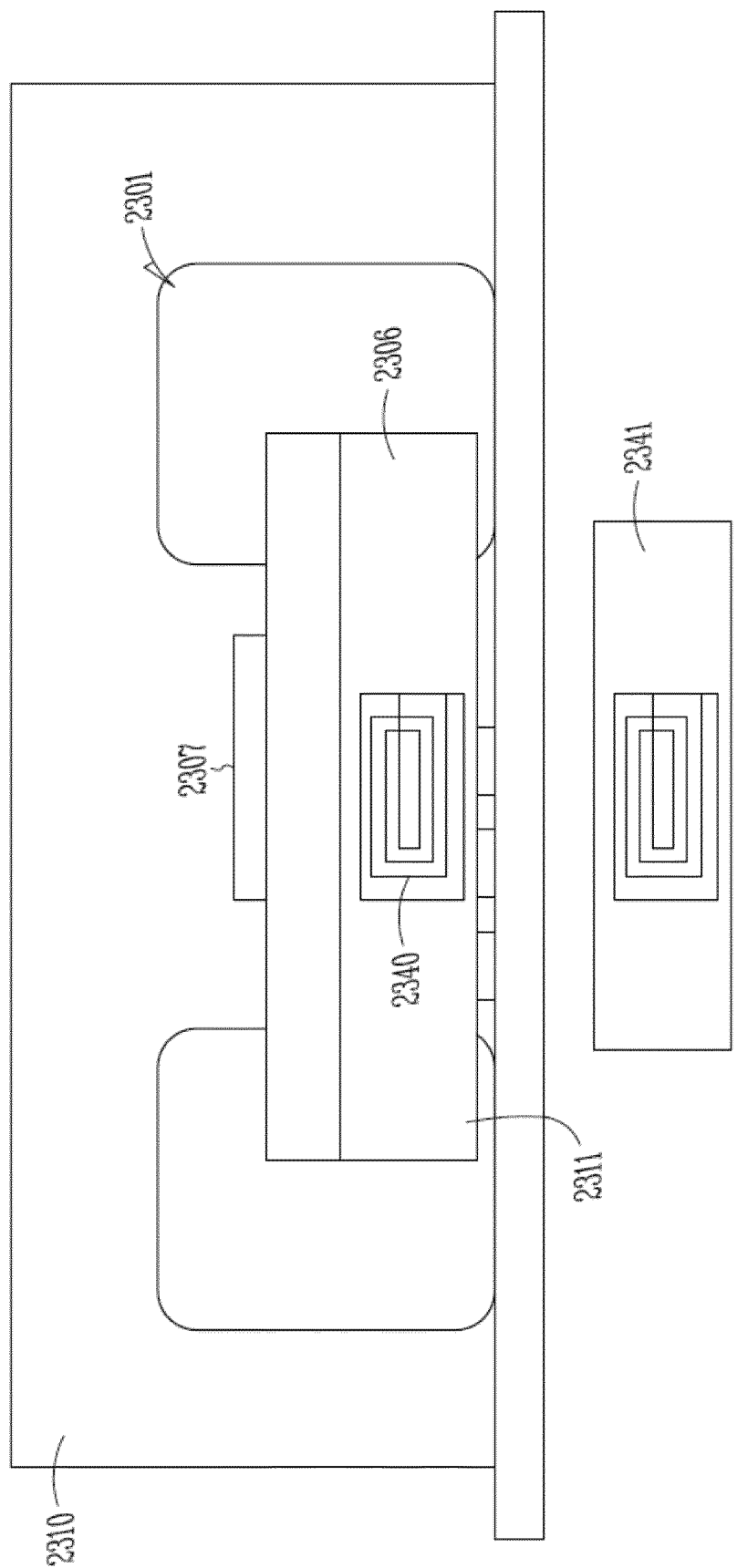
FIG. 23 illustrates a cross-section view of an example electrode structure and system for a submersible ion sensor, for example.

FIG. 23 illustrates a cross-section view of an example electrode structure and system for a submersible ion sensor, for example. The electrode structure can include a substrate 2306, ion sensitive material 2307, and packaging material 2301. In certain examples, the ion sensitive material 2307, signal traces and routing structures and processing electronics 2311 can be integrated with the substrate 2306 as shown for example in the other figures of the present application and in particular FIG. 5B. In certain examples, the package material 2301 can be fabricated to hold the substrate 2306, and to form a cavity or via to contain or route a target material. In certain examples, the cavity or via can be filled with a gel 2310 or reference material. In certain examples, instead of having external terminations from the processing electronics 2311 to communicate senor information, the substrate 2306 can include an antenna 2340 to wirelessly communicate the sensor information. In some examples, a companion communication device 2341 can be placed near the sensor to wirelessly exchange information with the sensor. In certain examples, the sensor can include a battery, capacitor, or some other energy storage device to supply power to the electrode and the processing electronics 2311. In some examples, energy can be wirelessly transferred to the sensor. In certain examples, the sensor can be placed in one or more locations that are not practical for wired ion sensors.

Figure 24:
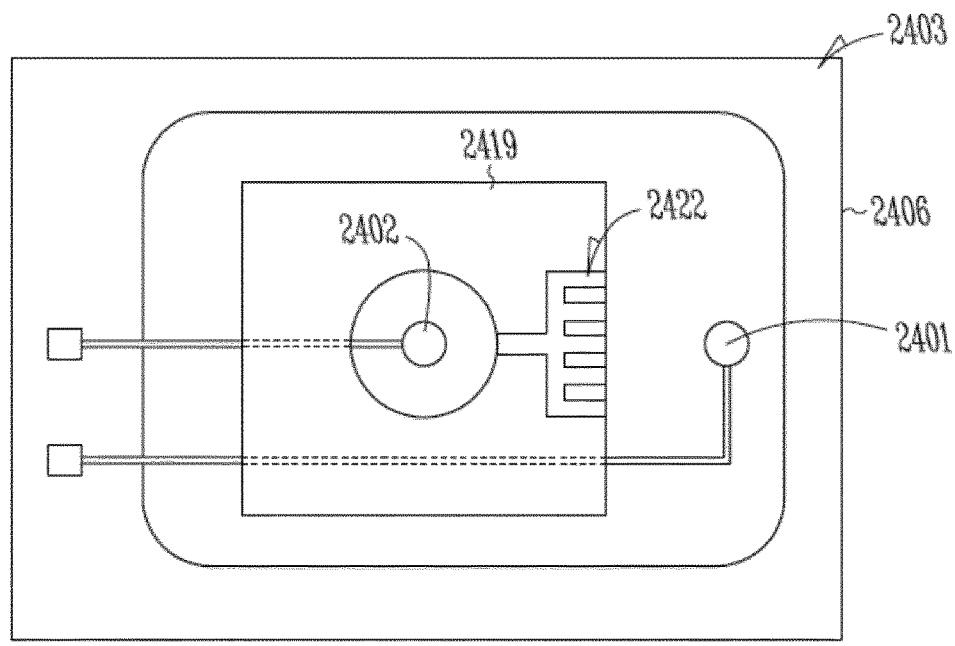
FIG. 24 illustrates generally an example sensor structure to mitigate premature sensor replacement due to channel fouling.

FIG. 24 illustrates generally an example sensor structure 2403 to help mitigate premature sensor replacement due to channel fouling. The sensor structure 2403 includes a substrate 2406 with a reference electrode 2402 and an indicating electrode 2401. Packaging material 2419 or substrate can be formed about the reference electrode 2402 to form a reservoir. The reservoir can contain a gel in certain examples. The packaging material 2419 can also include a channel 2422 such as to allow an electrical path to the reference electrode 2402 or the reservoir. In certain examples, the channel 2422 can provide multiple openings for the ions to pass through. Such a configuration can extend the useful sensing life of the sensor in applications where an opening to the channel can get blocked by sediment, or other solids. In certain examples, if one opening gets fouled or blocked, the electrical path can still pass through the channel via one of the other openings.

In certain examples, fouling of a sensor can also affect the output impedance of the sensor. In certain examples, output impedance of the sensor can be measured to detect wear-out of the sensor. In some examples, active electronics integrated with the substrate 2406 of the sensor can be used to measure the output impedance. In some examples, the output impedance can be measured by equipment coupled to the sensor structure.

Figure 25:
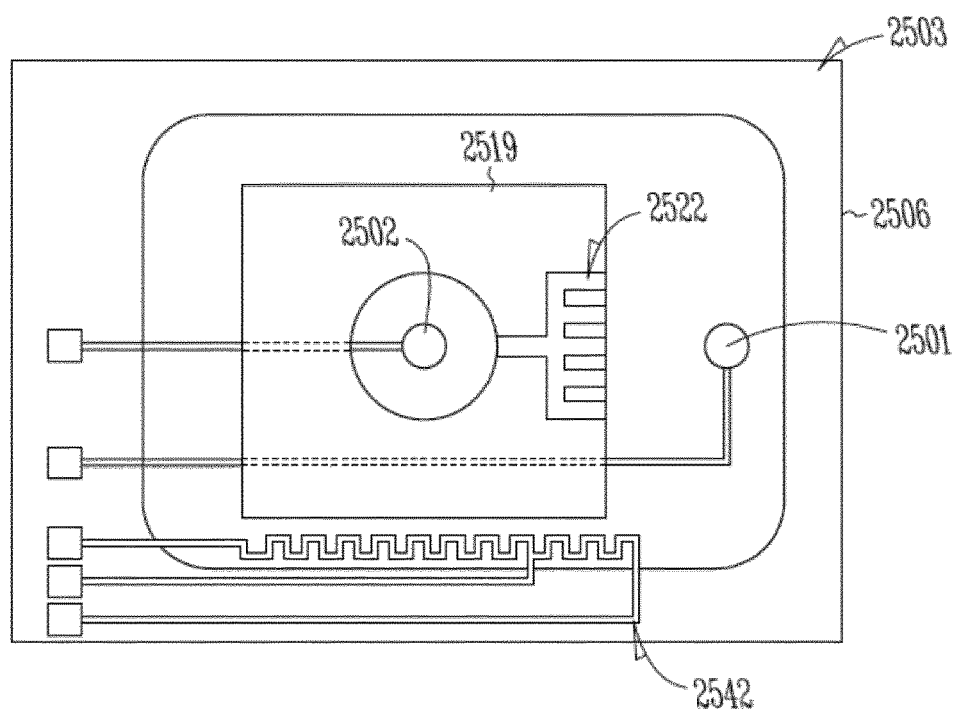
FIG. 25 illustrates generally an example sensor structure that includes a temperature sensor.

FIG. 25 illustrates generally an example sensor structure 1503 that includes a temperature sensor 2542. The sensor structure 2503 includes a substrate 2506 with a reference electrode 2502 and an indicating electrode 2501. Packaging material 2519 or substrate can be formed about the reference electrode 2502 to form a reservoir. The reservoir can contain a gel in certain examples. The packaging material 2519 can also include a channel 2522 to allow an electrical path to the reference electrode 2502 or the reservoir. In certain examples, the temperature sensor 2542 can include one or more metals that can cost effectively be deposited on the sensor substrate 2506. Many ion concentrations fluctuate as a function of temperature. Having a temperature sensor in close proximity to the target material being sensed can help to establish more precise determinations of ion concentration within a target material. In certain examples, the temperature sensor 2542 can be immune to damage via gamma sterilization. In some examples, the temperature sensor 2542 can be fabricated using a material which varies a property in response to temperature, for example, the material's electrical resistance. In some examples, the temperature sensor 2542 can be fabricated using two or more structures, each of which varies a property in response to temperature in such a way that the ratio of their property values is related to temperature.

Figure 26A:
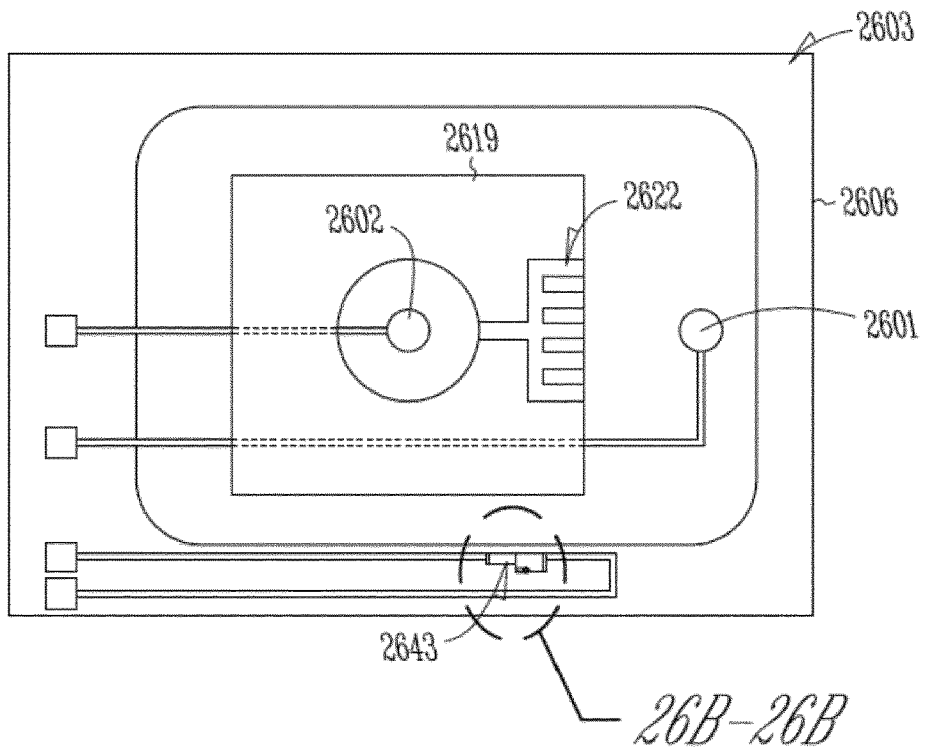
FIG. 26A-26C illustrate generally an example ion sensor structure that includes a section of adjustable resistive material.
Figure 26B:
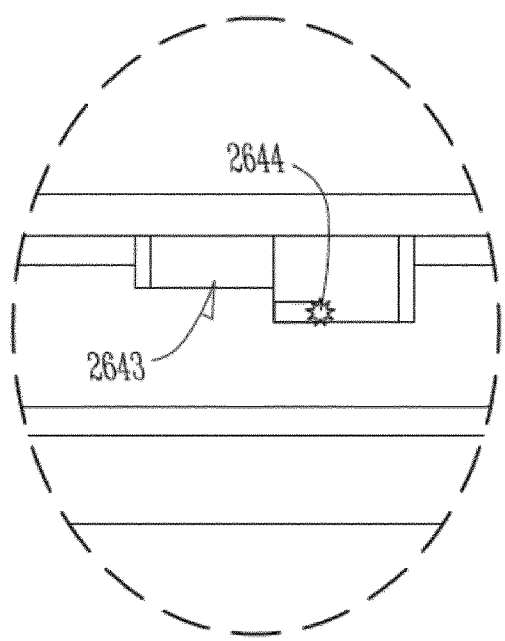
Figure 26C:
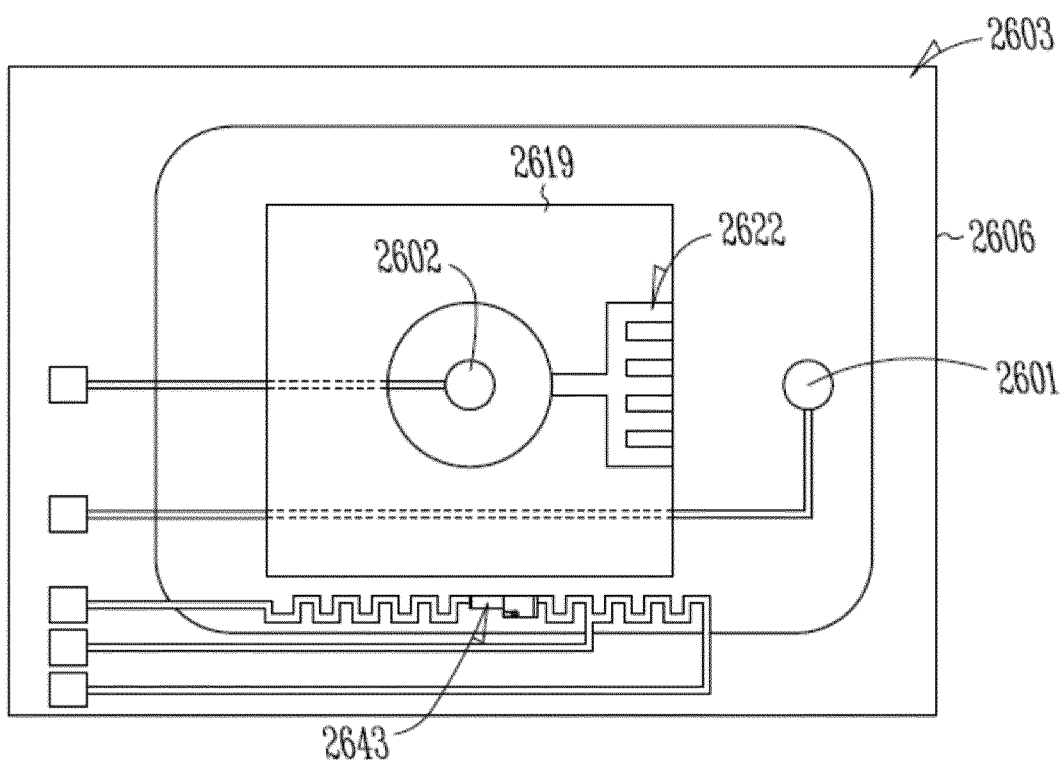

FIGS. 26A and 26B illustrate generally an example ion sensor structure 2603 that includes a section of resistive material 2643. The sensor structure 2603 includes a substrate 2606 with a reference electrode 2602 and an indicating electrode 2601. Packaging material 2619 or substrate can be formed about the reference electrode 2602 to form a reservoir. The reservoir can contain a gel in certain examples. The packaging material 2619 can also include a channel 2622 to allow an electrical path to the reference electrode 2602 or the reservoir. In certain examples, the resistive material can be modified or adjusted during a calibration procedure of the ion sensor. In certain examples, a laser 2644 can be used to ablate a portion of the resistive material during a calibration procedure. Such a configuration allows for on-chip calibration. In addition, processes such as gamma sterilization will not affect the calibration. In some examples, the resistive material can be trimmed or adjusted via links that can be selectively blown open. In certain examples, such as the example of FIG. 26C, the resistive material and traces to the resistive material can be configured to allow for ratio-metric calibration. In certain examples, ratio-metric trim can be more robust to process variation and can be easier to measure.

Figure 27:
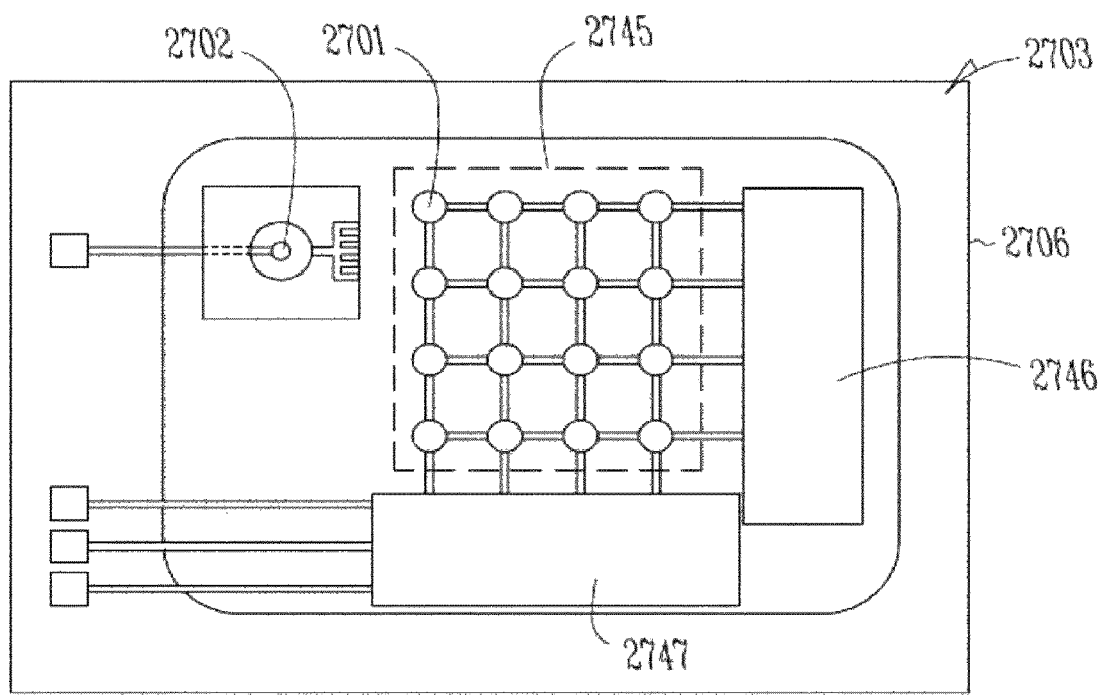
FIG. 27 illustrates generally an example sensor including an array of indicating electrodes.

FIG. 27 illustrates generally an example of a sensor 2703 including an array of indicating electrodes. The sensor 2703 can include a single reference electrode 2702, an array 2745 of indicating electrodes 2701 and decoder circuitry 2746, 2747. In certain examples, the reference electrode 2702 can include a structure as described above including a passive ion-sensitive material. In certain examples, the reference electrode 2702 can include one or more channels to allow a target material to migrate to, or form an electrical connection to sensing elements or materials, such as a gel, of the reference electrode 2702. In certain examples, the indicating electrodes 2701 of the array 2745 of indicating electrodes can include structures as discussed in any one of the preceding examples. In certain examples, an indicating electrode 2701 can include a passive ion-sensing material and a channel to guide a target material to the passive ion-sensing material. In certain examples, the indicating electrode 2701 does not include an active ion-sensing element such as an ion-sensing transistor.

In certain examples, the reference electrode 2702 and the array 2745 of indicating electrodes 2701 can be fabricated on a semiconductor substrate 2706. The decoding circuitry 2746, 2747 associated with the array 2745 of indicating electrodes 2701 can be integrated with the same substrate 2706. For example, on a side of the substrate 2706 other than the side including the ion-sensing material of the reference electrode 2702 and the ion-sensing material of the array 2745 of indicating electrodes 2701. The decode circuitry 2746, 2747 can include logic for selecting a particular one of the indicating electrodes 2701 and in generating a signal indicative of a state of the selected indicating electrode 2701. In certain examples, each of the indicating electrodes 2701 can be configured to provide information about the same ion. In some examples, each indicating electrode 2701 of the array 2745 of the indicating electrodes can be configured to provide information about a different ion. In some examples, more than one of the indicating electrodes 2701 can be configured to provide concentration information about a particular ion. In some examples, an electrode can be configured to provide concentration information of an ion when the ion concentration is within a certain range. In some examples, an electrode can be configured to provide concentration information of an ion when the target material that includes the ion is within a certain pressure range.

Figure 33:
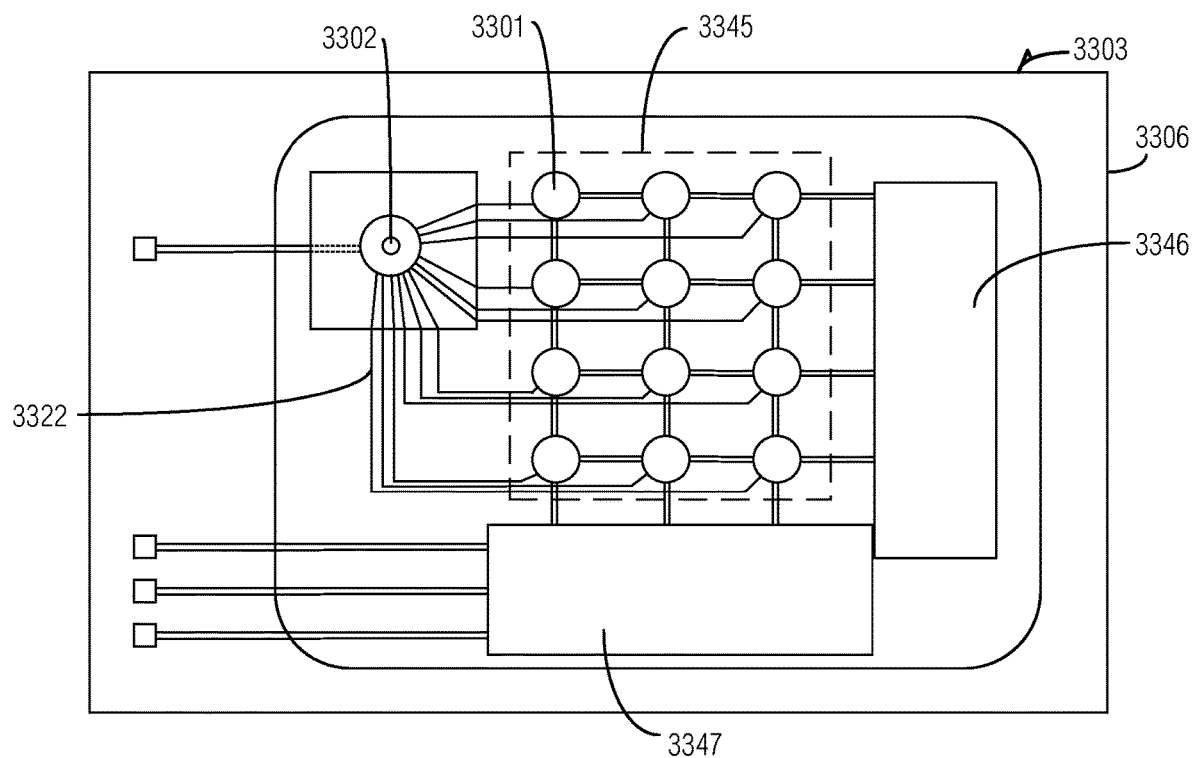
FIG. 33 illustrates generally an additional example of an arrayed sensor.

FIG. 33 illustrates generally an additional example of an arrayed sensor 3303. The arrayed sensor 3303 can include a single reference electrode 3302, an array 3345 of indicating electrodes 3301 and decoder circuitry 3346, 3347. In certain examples, the reference electrode 3302 can include a structure as described above including a passive ion-sensitive material. In certain examples, the reference electrode 3302 can include one or more channels to allow a target material to migrate to, or from, an electrical connection to sensing elements or materials, such as a gel, of the reference electrode 3302. In certain examples, the indicating electrodes 3301 of the array 3345 of indicating electrodes can include structures as discussed in any one of the preceding examples. In certain examples, an indicating electrode 3301 can include a passive ion-sensing material and a channel to guide a target material to the passive ion-sensing material. In certain examples, the indicating electrode 3301 does not include an active ion-sensing element such as an ion-sensing transistor.

In certain examples, such as the example arrayed sensor 3303 of FIG. 33, each indicating electrode of the array of indicating electrodes can correspond to a sample well and the array of sample wells can correspond to a standard for microplate dimensions as may be used in automated laboratory analysis systems. Such a standard for microplate dimensions can include, but is not limited to, ANSI SLAS 4-2004 (R2012) (formerly recognized as ANSI/SBS 4-2004), "for Microplates-Well Positions" (Oct. 13, 2011) as well as updates thereto. Such arrayed sensors 3303 can allow for sampling or measuring multiple individual samples at the same time. In certain examples, each indicating electrode 3301 can be associated with a dedicated channel 3322 coupling the well of the indicating electrode 3301 with the reference material of the reference electrode 3302. Such an example can allow for measuring many individual samples for an ion concentration dictated by the ion sensitive material of each indicating electrode 3301 and the configuration of the reference electrode 3302 and reference material.

In certain examples, the reference electrode 3302 and the array 3345 of indicating electrodes 3301 can be fabricated on a semiconductor substrate 3306. The decoding circuitry 3346, 3347 associated with the array 3345 of indicating electrodes 3301 can be integrated with the same substrate 3306. In some examples, the decoding circuitry, such as a multiplexer, can be located on a side of the substrate 3306 other than the side including the ion-sensing material of the reference electrode 3302 and the ion-sensing material of the array 3345 of indicating electrodes 3301. In some examples, the decoding circuitry can be located on the same side of the substrate as the ion sensing material and can be protected from the reference or target materials, for example, by an oxide layer. The decode circuitry 3346, 3347 can include logic, such as a multiplexer, for selecting a particular one of the indicating electrodes 3301 and in generating a signal indicative of a state of the selected indicating electrode 3301. In certain examples, each of the indicating electrodes 3301 can be configured to provide information about the same ion.

Figure 28:
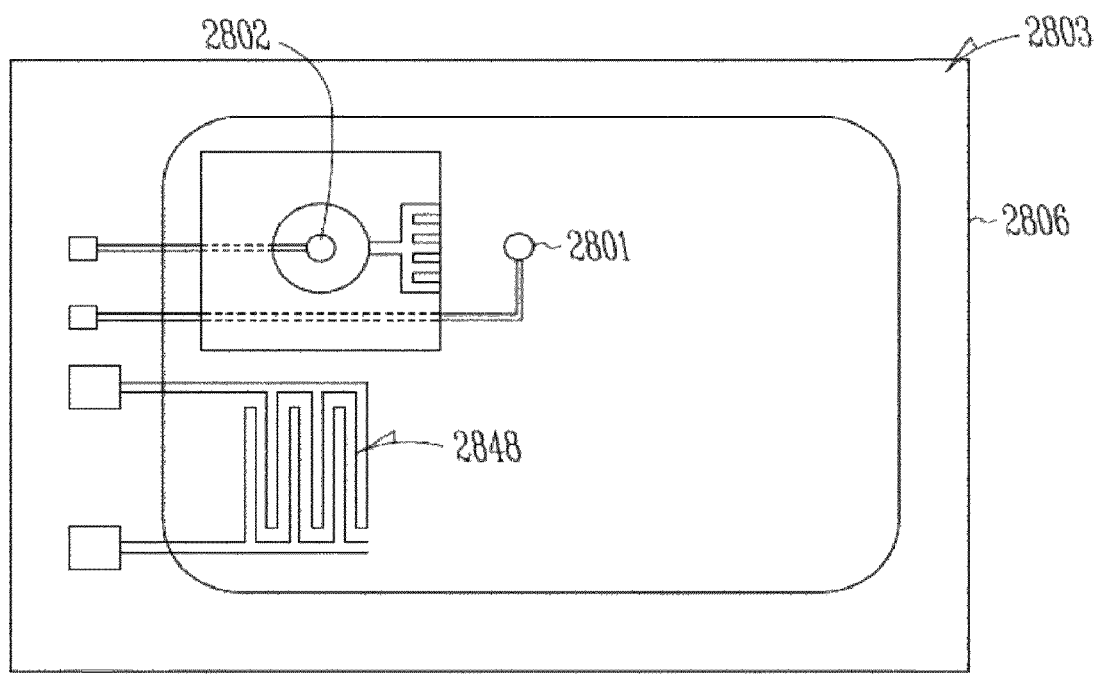
FIG. 28 illustrates generally an example sensor structure with a conductivity sensor.

FIG. 28 illustrates generally an example of a sensor probe 2803 with an impedance sensor 2848. As discussed above with respect to several examples, in addition to electrodes 2801, 2802 used to sense an ion or an ion concentration, a sensor structure or probe 2803 can include other sensors. In certain examples, sensor probe 2803 can include an impedance sensor 2848. In certain examples, the impedance sensor 2848 can provide an indication of when the sensor probe 2803 is in contact with a material, for example, a target liquid. In addition, an impedance sensor 2848 having a proper layout can provide an indication of whether a sufficient amount of target material is available to, for example, cover the electrodes and allow for a proper ion concentration measurement. In general, an impedance sensor 2848 can provide an indication of the total concentration of ions in a liquid, for example as opposed to the ion sensing electrodes providing an indication of a concentration of a particular ion in the liquid.

Figure 29A:
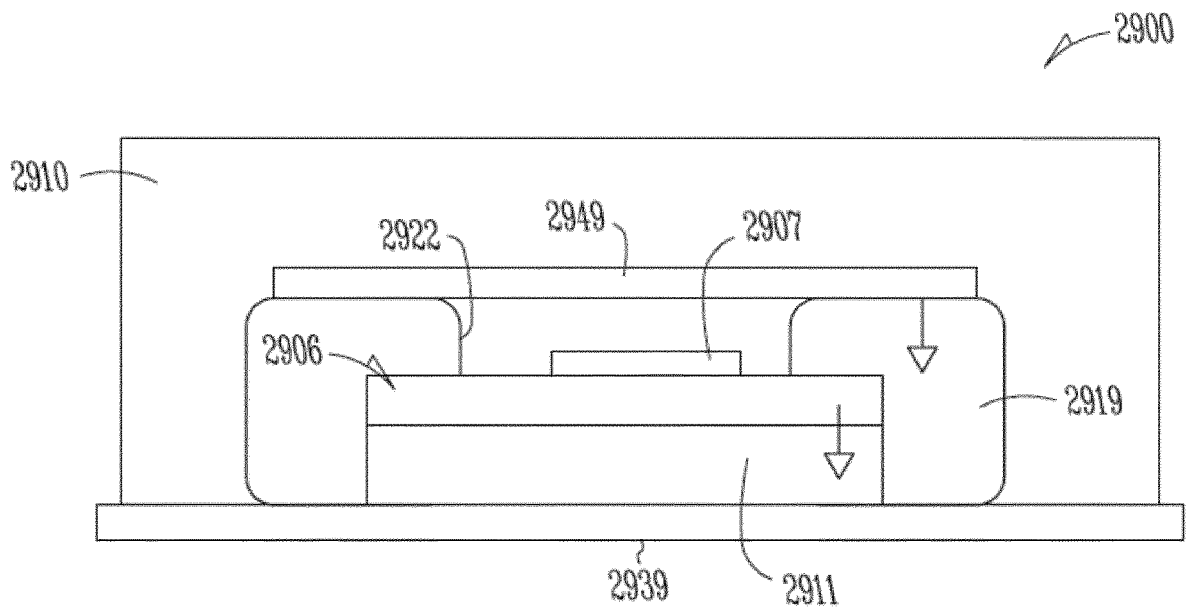
FIGS. 29A and 29B illustrate generally, example electrode structures that include a shield to protect the electrode.
Figure 29B:
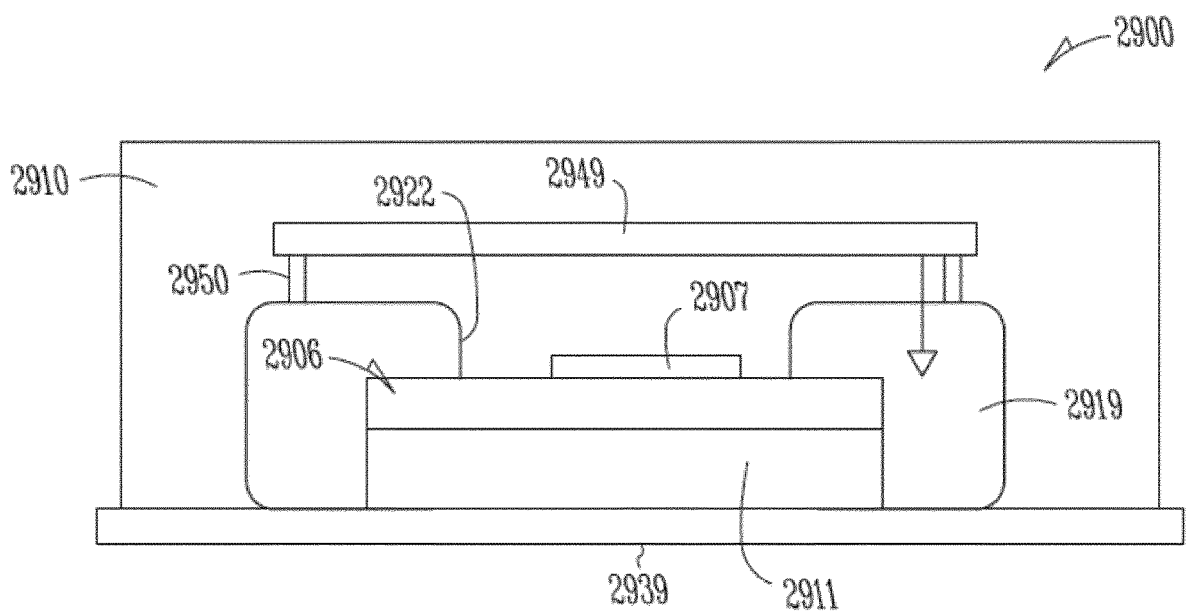

FIGS. 29A and 29B illustrate generally an example of a sensor structure 2900 or probe that include a shield 2949 to protect the electrode. As discussed above, each electrode in an electrode structure provides a voltage that can be processed to provide an indication of an ion concentration. However, the signal directly generated by each electrode can be susceptible to interference such as electromagnetic interference. FIG. 29A illustrates generally an electrode structure 2900 that includes a shield 2949 over a via 2922 leading to the passive ion-sensitive material 2907 of the electrode. In certain examples, the shield 2949 can seal the via 2922. In such an example, the shield 2949 can be porous, such as to allow a target material 2910 to contact sensing elements of the electrode. The shield 2949 can include conductive materials for interrupting electromagnetic interference near the electrode. In certain examples, the shield 2949 can be coupled to ground or to a reference terminal of a battery of the electrode structure 2900. In some examples, the electrode structure 2900 can provide a conductive path to connect the shield to ground. FIG. 29B illustrates generally an example of a shield 2949 that can be coupled to, for example, packaging material 2919 of the electrode structure 2900 using stand-offs 2950 so as to allow target material 2910 to pass under the shield 2949 to the via 2922. In such an example, the shield 2949 can be non-porous. In certain examples, the electrode structure can optionally include a substrate 2906, package material 2919, electronics 2911 integrated with the substrate 2906, a circuit board 2939, reference material 2910, or combinations thereof.

In certain examples, the shield 2949 can include a light barrier. Light can sometimes affect the performance of the electrode, and in some cases, shorten the useful life of the electrode compared with electrodes that are not exposed to ambient light. In certain examples, the electrode structure 2900 can include the light shield coupled to the package material 2919 forming the via 2922. In some examples, the electrode structure 2900 can include the light shield coupled to the package material 2919 using stand-offs 2950 so target material, or reference material 2910 can access the via 2922 and complete an electrical circuit with the sensing elements of the electrode such as the gel or the passive ion sensing element 2907 of the electrode.

Figure 30:
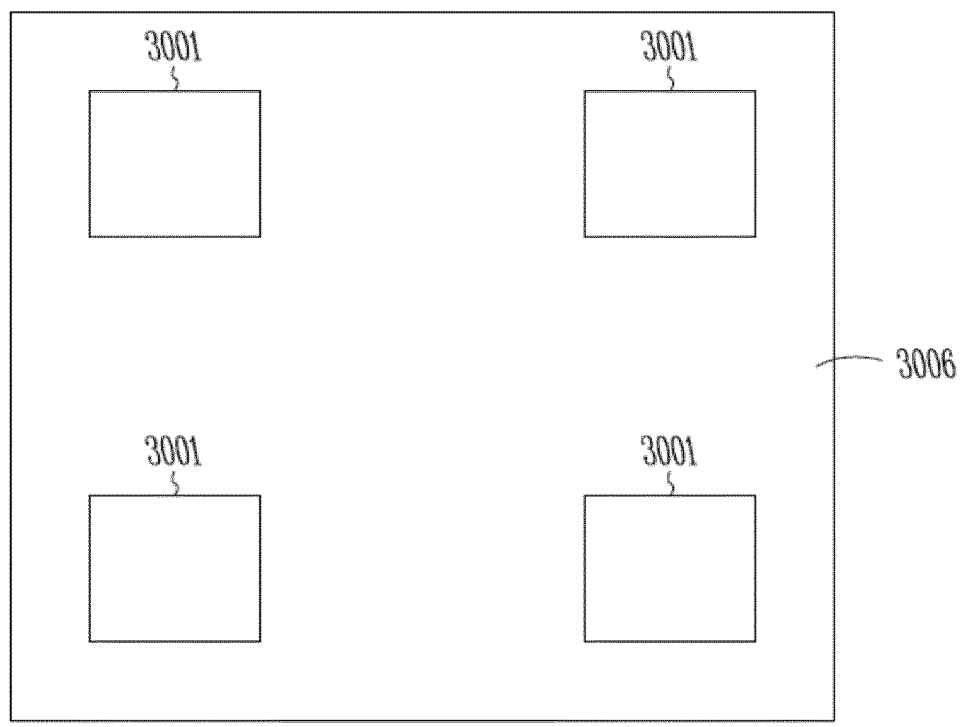
FIG. 30 illustrates generally a sensor structure that can allow for extended operation using addressable or sequentially activated electrodes.

FIG. 30 illustrates generally a substrate 3006 including a plurality of sensor structures 3001 that can allow for extended operation. The extended operation is enable using addressable or sequentially activated electrodes. In certain examples, as a first electrode structure reaches the end of its useful sensing life, a second electrode structure can be activated by, for example, piercing or rupturing a membrane of the electrode structure.

Figure 31:
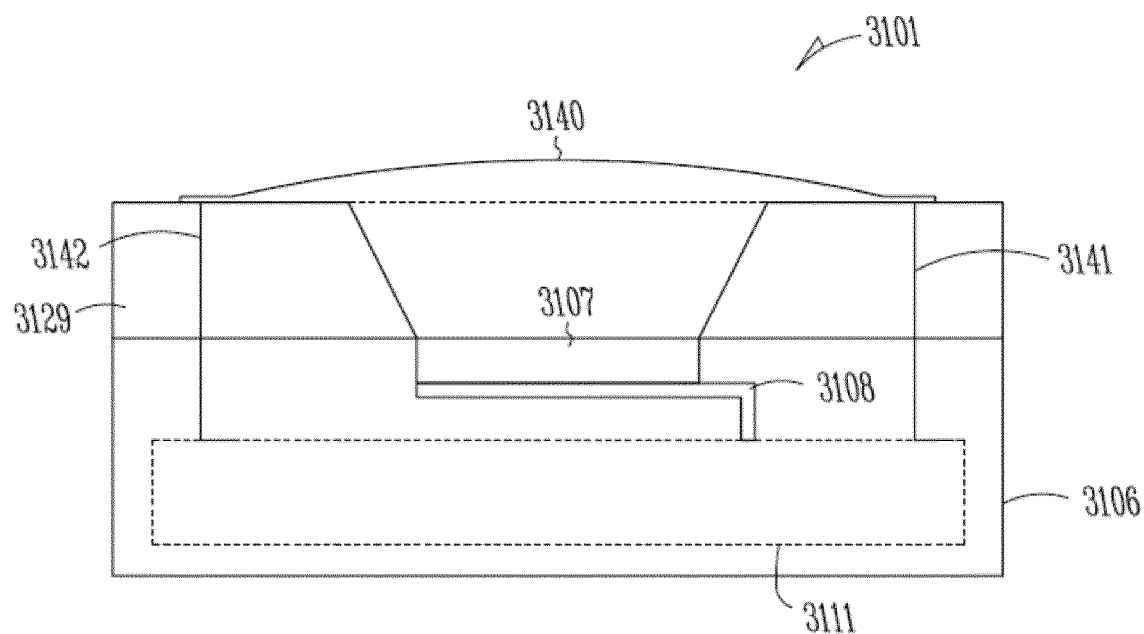
FIG. 31 illustrates general an example of an electrode structure of a sensor that can be used as part of the system illustrated in FIG. 30.

FIG. 31 illustrates generally an example of an electrode structure 3101 of a sensor that can be used as part of the system illustrated in FIG. 30. The electrode structure can include a substrate 3106, active electronics 3111, integrated with the substrate 3106, an ion-sensitive material 3107, an electrically conductive trace 3108 to connect the ion sensitive material 3107 with the active electronics 3111, additional substrate material or packaging material 3129 and a membrane 3140. The membrane 3140 can isolate target material or other material from accessing the ion sensitive material 3107. The membrane can include electrical connections 3141, 3142 to the active electronics. In certain examples, heat can be used to pop or pierce the membrane. In certain examples, heating elements contacting or immediately adjacent the membrane 3140 can be activated to rupture the membrane 3140 via heat. In certain examples, the heating element can be integrated with the membrane 3140 such that when the electrode structure 3101 is selected for active sensing use, the heating element can be activated via the electrical connections 3141, 3142 and can rupture the membrane 3140 allowing target material to access the ion-sensitive material 3107. In some examples, the membrane 3140 can include a piezoelectric material. When the electrode structure 3101 is selected for active sensing use, the piezoelectric can be activated via the electrical connections 3141, 3142 and can, for example, vibrate to rupture the membrane 3140 allowing target material to access the ion-sensitive material 3107. In certain examples, the sensor can include a selection circuit that can sequentially rupture a next membrane each time a single input to the selection circuit is activated for a minimum time period, where the minimum time period is indicative of a maximum time needed for a typical heating element or piezoelectric device to rupture a corresponding membrane of the sensor structure. In certain example, piezoelectric materials can also be used to prevent or eliminate fouling of electrode structures.

Figure 32:
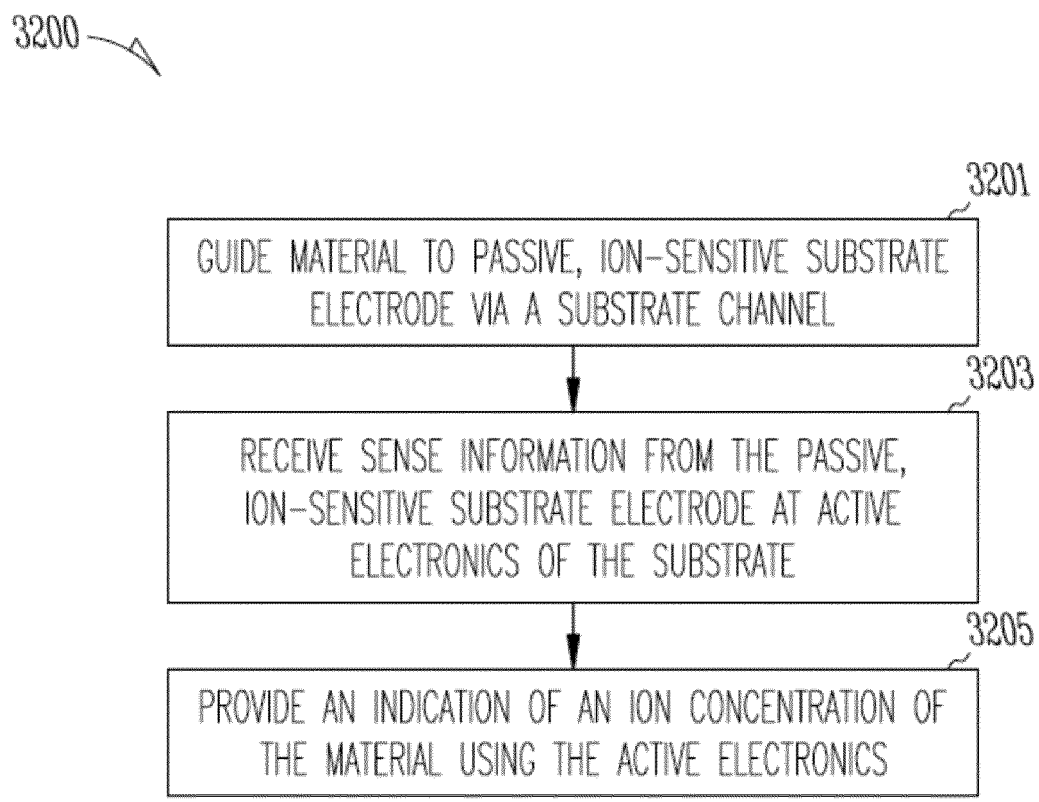
FIG. 32 illustrates generally a flowchart of an example method for operating an apparatus that includes a passive, ion-sensitive electrode.

FIG. 32 illustrates generally a flowchart of an example of a method 3200 for operating an apparatus that includes a passive, ion-sensitive electrode. At 3201, test material can be guided to the passive, ion-sensitive electrode using a channel integrated within the same substrate that includes the passive, ion-sensitive electrode. In certain examples, the test material can be guided using a microchannel of a substrate that also houses the passive, ion-sensitive electrode. In some examples, the microchannel can guide the test material laterally through the substrate to the passive, ion-sensitive electrode. In certain examples, the microchannel can guide the test material vertically through the substrate to the passive, ion-sensitive electrode. In some examples, the substrate can include a combination of microchannels to guide the test material to the passive, ion-sensitive electrode. In certain examples, the substrate can include stacked layers and the stacked layers can include microchannels that when stacked, guide the test material to the passive, ion-sensitive electrode.

In certain example, the substrate can include a via over the passive, ion-sensitive electrode to guide the test material to the passive, ion-sensitive electrode. In some examples, the via can include a gel or a filter. In some examples, the substrate can include multiple passive, ion-sensitive electrodes supported by a via or a microchannel for guiding the test material to the passive, ion-sensitive electrode.

In certain examples, a system can be used to selectively guide the test material to a passive, ion-sensitive electrode. In some examples, a substrate can include multiple passive, ion-sensitive electrodes. A selection device can be coupled to the substrate. The selection device can include an opening and can be positioned to guide test material to one passive, ion-sensitive electrodes of the multiple passive, ion-sensitive electrodes. The mechanism can cover and isolate the test material from other previously unselected passive, ion-sensitive electrodes of the multiple passive, ion-sensitive electrodes. Such an apparatus can be submerged in a test material or solution and can provide measurement information for a long time compared to a sensor with a single indicating electrode. In certain examples, a substrate can include multiple passive, ion-sensitive electrodes and a membrane over one or more of the passive, ion-sensitive electrodes can be used to select an electrode or set of electrodes for measuring a test material or solution. In some examples, rupturing the membrane can select or activate an electrode for providing measurement information. In certain examples, the membrane can be electronically ruptured using a heating element adjacent to the membrane or integrated with the membrane. Such a mechanism or system can allow the active electronics integrated with the substrate that includes the multiple passive, ion-sensitive electrodes to monitor parameters and automatically select an electrode or a set of electrodes to provide measurement information. In certain examples, the parameters can include parameters associated with characteristics of the test material such as on concentration, pressure, temperature, etc. In certain examples, the parameters can include parameters associated with a currently active electrode such as measurement quality parameters, active measurement lifetime of a currently active sensor, etc.

At 3203, sense information of the passive, ion-sensitive electrode can be received at active electronics integrated with the substrate. Receiving sense information from the one or more passive, ion-sensitive electrodes, such as a combination of an indicating electrode and a reference electrode as discussed above, at electronics integrated with the same substrate can reduce or eliminate interference issues associated with conventional ion-sensing devices. In addition, the sensors can be quite small, can be submersible, can be inexpensive and can provide robust performance in wide variety of environments including harsh environments where some conventional, expensive equipment is not used.

At 3205, an indication of an ion concentration of the test material can be provided as an output of the active electronics. In certain examples, the sense information can be processed by the active electronics of the substrate and ion concentration information among other information can be provided via wired or wireless media. In certain examples, the indication can be an analog signal, a digital signal or a combination of analog and digital signals.

Measurement data generated by the microfluidic system (such as the specific values/readings/thresholds etc.) can be encrypted to protect the integrity or functional safety of the system. In certain examples, the encryption can be accomplished via processing electronics integrated on the substrate of the electrodes of the sensor. Encryption may be accomplished via software, firmware or hardware to ensure that the measurement information is not compromised at the sensor or during transmission of the data from the sensor.

VARIOUS NOTES & EXAMPLES

In Aspect 1, an integrated ion-sensitive probe apparatus for sensing a concentration of a material without requiring an active electrode can include a semiconductor substrate, a first passive electrode integrated with the semiconductor substrate and configured to contact a solution and to provide a first electrical voltage as a function of a concentration of an ion within the solution, and a channel configured to guide the solution to the first passive electrode.

In Aspect 2, the channel of Aspect 1 optionally includes an opening in the substrate and the first passive electrode lies at a bottom surface of the opening.

In Aspect 3, sidewalls surfaces of the channel of any one or more of Aspects 1-2 optionally are sloped from an upper surface of the semiconductor substrate toward the first passive electrode.

In Aspect 4, sidewalls surfaces of the channel of any one or more of Aspects 1-3 optionally are stepped from an upper surface of the semiconductor substrate toward the first passive electrode.

In Aspect 5, the channel of any one or more of Aspects 1-4 optionally includes a first microchannel configured to conduct the solution to the first passive electrode.

In Aspect 6, the substrate of any one or more of Aspects 1-52 optionally includes a plurality of second microchannels coupled to the first microchannel, the plurality of second microchannels configured to allow operation of the apparatus when one of the second microchannels is fouled.

In Aspect 7, the first passive electrode of any one or more of Aspects 1-6 optionally lies in a first plane, and the first microchannel of any one or more of Aspects 1-6 optionally is configured to conduct the solution, within the substrate, parallel to the first plane.

In Aspect 8, the first microchannel of any one or more of Aspects 1-7 optionally extends a length through the substrate, and the first microchannel within the substrate is open along the length.

In Aspect 9, the apparatus of any one or more of Aspects 1-7 optionally includes a cap configured to close the first microchannel along the length.

In Aspect 10, the first passive electrode of any one or more of Aspects 1-9 optionally lies in a first plane, and the first microchannel of any one or more of Aspects 1-9 optionally is configured to conduct the solution, within the substrate, perpendicular to the first plane.

In Aspect 11, the substrate of any one or more of Aspects 1-10 optionally includes a thermal device positioned adjacent the first microchannel.

In Aspect 12, the substrate of any one or more of Aspects 1-11 optionally includes a magnetic device positioned adjacent the first microchannel.

In Aspect 13, the substrate of any one or more of Aspects 1-12 optionally includes a second microchannel, wherein the second microchannel intersects the first microchannel.

In Aspect 14, the apparatus of any one or more of Aspects 1-13 optionally includes a filter inserted within the second microchannel.

In Aspect 15, the apparatus of any one or more of Aspects 1-14 optionally includes a gel inserted within the second microchannel.

In Aspect 16, the first passive electrode of any one or more of Aspects 1-15 optionally lies in a first plane of the substrate, and the apparatus includes a second passive electrode lying in a second plane of the substrate, the second plane parallel with the first plane.

In Aspect 17, the second plane of any one or more of Aspects 1-16 optionally is at a different depth within the substrate.

In Aspect 18, the substrate of any one or more of Aspects 1-17 optionally includes a microchannel configured to conduct the solution to the first passive electrode and to the second passive electrode.

In Aspect 19, the substrate of any one or more of Aspects 1-18 optionally includes external electrical interconnects.

In Aspect 20, the apparatus of any one or more of Aspects 1-19 optionally includes a circuit board for routing electrical signals to and from the apparatus via the external electrical interconnects of the substrate and mating electrical interconnects of the circuit board.

In Aspect 21, the apparatus of any one or more of Aspects 1-20 optionally includes a guide housing having an end stop, the guide housing mounted to the circuit board and configured guide positioning of the semiconductor substrate as the substrate is inserted into and out of the guide housing, and wherein the end stop is configured to reference the substrate, after insertion of the substrate within the guide housing, and to align the external electrical interconnects of the substrate with the mating electrical interconnects of the circuit board.

In Aspect 22, the apparatus of any one or more of Aspects 1-21 optionally includes a shield over the first passive electrode.

In Aspect 23, the apparatus of any one or more of Aspects 1-22 optionally includes standoffs configured to allow passage of the target material under the shield to the first passive electrode.

In Aspect 24, the shield of any one or more of Aspects 1-23 optionally is an electromagnetic shield.

In Aspect 25, the shield of any one or more of Aspects 1-24 optionally is a light shield.

In Aspect 26, the shield of any one or more of Aspects 1-25 optionally is porous.

In Aspect 27, the shield of any one or more of Aspects 1-26 optionally is configured to isolate the target material from contact with the first passive electrode.

In Aspect 28, the apparatus of any one or more of Aspects 1-27 optionally includes a device coupled to an integrated circuit of the substrate, the device configured to rupture the shield.

In Aspect 29, the device of any one or more of Aspects 1-28 optionally includes a heating device.

In Aspect 30, the device of any one or more of Aspects 1-29 optionally includes a piezoelectric device.

In Aspect 31, the apparatus of any one or more of Aspects 1-30 optionally includes an integrated circuit fabricated on the substrate, the integrated circuit configured to buffer a signal provided by the first passive electrode.

In Aspect 32, the apparatus of any one or more of Aspects 1-31 optionally includes a temperature sensor integrated on the substrate and coupled to the integrated circuit.

In Aspect 33, the apparatus of any one or more of Aspects 1-32 optionally includes a pressure sensor integrated on the substrate and coupled to the integrated circuit.

In Aspect 34, the apparatus of any one or more of Aspects 1-33 optionally includes a resistive calibration circuit integrated on the substrate and coupled to the integrated circuit.

In Aspect 35, the resistive material of any one or more of Aspects 1-34 optionally is configured for ratio-metric calibration trimming.

In Aspect 36, the apparatus of any one or more of Aspects 1-35 optionally includes blow-able links to adjust the resistive calibration circuit.

In Aspect 37, an apparatus can include a substrate, and a plurality of ion-sensitive electrode structures fabricated on the substrate, wherein one or more of the plurality of ion-sensitive structures includes a passive, ion-sensitive electrode configured to contact a solution and to provide a first electrical voltage as a function of a concentration of an ion within the solution. The apparatus can be configured for sensing a concentration of a material without requiring an active electrode In Aspect 38, the apparatus of any one or more of Aspects 1-37 optionally includes a shield having an opening, the shield configured to isolate the solution from at least a subset of the plurality of ion-sensitive electrodes, the opening configured to allow the solution to contact one ion-sensitive electrode of the plurality of ion-sensitive electrodes when the opening is positioned over the one ion-sensitive electrode.

In Aspect 39, the shield of any one or more of Aspects 1-38 optionally is anchored to the substrate.

In Aspect 40, the shield of any one or more of Aspects 1-39 optionally is configured to rotate about an anchor to allow the opening to selectively access a selected one of the plurality of ion-sensitive electrodes.

In Aspect 41, the plurality of ion-sensitive electrode structures of any one or more of Aspects 1-40 optionally are arranged in an array, and the apparatus of any one or more of Aspects 1-40 optionally includes a decoder circuit integrated with the substrate, wherein the decoder circuit is configured to route the first electrical voltage of a particular one of the plurality of ion-sensitive electrode structures to a processing circuit.

In Aspect 42, the decoder circuit of any one or more of Aspects 1-41 optionally is configured to receive selection information from the processing circuit and to route the first electrical voltage of the particular one of the plurality of ion-sensitive electrode structures to the processing circuit in response to the selection information.

In Aspect 43, a method of operating an integrated sensor apparatus to detect a concentration of a material without requiring an active electrode can include guiding material to a passive, ion-sensitive electrode via a channel of a substrate, the substrate including the passive ion-sensitive electrode, receiving sense information from the passive, ion-sensitive electrode at active electronics integrated with the substrate, and providing an indication of an ion concentration of the material using the active electronics.

In Aspect 44, the guiding the material to a passive, ion-sensitive electrode of any one or more of Aspects 1-43 optionally includes rotating an opening of a shield over the passive, ion-sensitive electrode.

In Aspect 45, the passive, ion-sensitive electrode of any one or more of Aspects 1-44 optionally is one of an array of passive, ion-sensitive electrodes, and the receiving sense information from the passive, ion-sensitive electrode of any one or more of Aspects 1-44 optionally includes receiving selection information at a decoder of the active electronics and routing the sense information to the active electronics via the decoder in response to the selection information.

In Aspect 46, the method of any one or more of Aspects 1-45 optionally includes receiving temperature information at the active electronics from a temperature sensor integrated with the substrate.

In Aspect 47, the method of any one or more of Aspects 1-35 optionally includes calibrating the active electronics using a calibration resistance integrated with the substrate, wherein the calibrating includes adjusting the calibration resistance.

In Aspect 48, the adjusting the calibration resistance of any one or more of Aspects 1-47 optionally includes laser trimming a portion of the calibration resistance.

In Aspect 49, the guiding the material of any one or more of Aspects 1-48 optionally includes rupturing a membrane isolating the material from the passive, ion-sensitive electrode.

In Aspect 50, the rupturing the membrane of any one or more of Aspects 1-49 optionally includes activating a heating element adjacent the membrane.

In Aspect 51, the rupturing the membrane of any one or more of Aspects 1-50 optionally includes electrically exciting a piezoelectric element of the membrane.

In Aspect 52, the guiding the material of any one or more of Aspects 1-51 optionally includes guiding material to a passive, ion-sensitive electrode via a microchannel of a substrate.

In Aspect 53, the guiding the material of any one or more of Aspects 1-52 optionally includes conditioning the material using a device positioned adjacent the microchannel.

In Aspect 54, the conditioning the material of any one or more of Aspects 1-53 optionally includes applying magnetic energy to the material using a magnetic device positioned adjacent the microchannel.

In Aspect 55, the conditioning the material of any one or more of Aspects 1-54 optionally includes exchanging thermal energy with the material using a thermal device positioned adjacent the microchannel.

In Aspect 56, the thermal device of any one or more of Aspects 1-55 optionally includes a heater.

In Aspect 57, the providing an indication of any one or more of Aspects 1-56 optionally includes amplifying a signal received from the passive, ion-sensitive electrode at an amplifier of the active electronics.

In Aspect 58, the providing an indication includes wirelessly communicating the indication from the substrate including the passive, ion-sensitive electrode.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The invention claimed is:
1. An integrated ion-sensitive probe apparatus for sensing a concentration of a material, the apparatus comprising:
 a semiconductor substrate;
 a first electrode integrated with the semiconductor substrate and configured to contact a solution and to provide a first electrical voltage as a function of a concentration of an ion within the solution;
 a cavity configured to expose the solution to the first electrode;
 a temperature device configured to monitor or adjust a temperature of the solution, or both; and
 a reference electrode structure integrated with the semiconductor substrate, the reference electrode structure comprising:
  a second electrode; and a vessel configured to hold a reference material in contact with the second electrode;

wherein the vessel comprises a barrier configured to at least partially seal the reference material within the vessel and wherein a portion of the vessel provides an electrical interface between the reference material and the solution.

2. The apparatus of claim 1, wherein the solution is a reference solution.

3. A method of operating a sensor apparatus, the method comprising:

exposing a material to an ion-sensitive electrode via a cavity of a substrate, the substrate including the ion-sensitive electrode;

receiving sense information from the ion-sensitive electrode at active electronics in communication with the substrate;

providing an indication of an ion concentration of the material using the active electronics;

using a temperature device to monitor or adjust a temperature of the material, or both;

containing a reference material within a vessel integrated with the substrate;

exposing the reference material to a reference electrode;

using a portion of the vessel to establish an electrical connection or interface between the ion-sensitive electrode and the reference electrode; and calibrating the active electronics using a calibration structure integrated with the substrate;

wherein the potion of the vessel used to establish the electrical connection or interface between the ion-sensitive electrode and the reference electrode comprises a barrier configured to at least partially seal the reference material within the vessel.

4. The method of claim 3, wherein the exposing the material to an ion-sensitive electrode includes rotating an opening of a shield over the ion-sensitive electrode.

5. The method of claim 3, wherein the ion-sensitive electrode is one of an array of ion-sensitive electrodes; and wherein receiving sense information from the ion-sensitive electrode includes receiving selection information at a decoder of the active electronics and routing the sense information to the active electronics via the decoder in response to the selection information.

6. The method of claim 3, wherein exposing the material comprises guiding the material to the ion-sensitive electrode via a channel of the substrate.

7. The method of claim 6, wherein the guiding the material includes rupturing a membrane isolating the material from the ion-sensitive electrode.

8. The method of claim 7, wherein the rupturing the membrane includes electrically exciting a piezoelectric element of the membrane.

9. The method of claim 6, wherein the guiding the material includes guiding material to the ion-sensitive electrode via a microchannel of a substrate.

10. The method of claim 3, wherein the active electronics are integrated with the substrate on a first side of the substrate opposite a second side of the substrate to which the ion-sensitive electrode is integrated.

11. The method of claim 3, wherein the calibration structure comprises a calibration resistance.

12. An integrated ion-sensitive probe apparatus for sensing a concentration of a material, the apparatus comprising:

a substrate;

a first electrode integrated with the substrate and configured to contact a solution and to provide a first electrical voltage as a function of a concentration of an ion within the solution;

a cavity configured to expose the solution to the first electrode;

a calibration structure integrated with the substrate, the calibration structure configured to calibrate active electronics in communication with the substrate;

a temperature device configured to monitor or adjust a temperature of the solution, or both; and a reference electrode structure integrated with the substrate, the reference electrode structure comprising:

a second electrode; and a vessel configured to hold a reference material in contact with the second electrode;

wherein the vessel comprises a barrier configured to at least partially seal the reference material within the vessel and wherein a portion of the vessel provides an electrical interface between the reference material and the solution.

13. The apparatus of claim 12, wherein the first electrode is a first indicating electrode and the apparatus includes a plurality of additional indicating electrodes arranged in an array with the first indicating electrode to form an array of indicating electrodes.

14. The apparatus of claim 13, wherein the reference electrode structure further comprises:

at least one microchannel configured to establish an ion exchange interface between the reference material in the vessel and a target material in contact with at least one of the first indicating electrode or the plurality of additional indicating electrodes.

15. The apparatus of claim 12, wherein the cavity comprises a channel configured to guide the solution to the first electrode.

16. The apparatus of claim 15, wherein the channel includes a first microchannel configured to conduct the solution to the first electrode.

17. The apparatus of claim 16, wherein the substrate includes a plurality of second microchannels coupled to the first microchannel, the plurality of second microchannels configured to allow operation of the apparatus when one of the second microchannels is fouled.

18. The apparatus of claim 16, wherein the first electrode lies in a first plane; and wherein the first microchannel is configured to conduct the solution, within the substrate, perpendicular to the first plane.

19. The apparatus of claim 15, wherein the channel includes at least one of a filter, a semi-permeable membrane, a magnetic element, a heating element, or a piezoelectric element.

20. The apparatus of claim 12, further comprising a shield trace connected to ground, the shield trace configured to protect the first electrode from interference.

21. The apparatus of claim 12, further comprising a cap configured to cover the cavity and form a channel.

22. The apparatus of claim 12, wherein the calibration structure comprises a calibration resistance.

23. The apparatus of claim 12, further comprising sensing elements in communication with the active electronics.

* * * * *